(12) United States Patent
Chunodkar et al.

(10) Patent No.: US 10,935,127 B2
(45) Date of Patent: Mar. 2, 2021

(54) SYSTEMS AND METHODS FOR PREDICTIVE GEAR SHIFTING AND INTEGRATED PREDICTIVE CRUISE CONTROL

(71) Applicant: Cummins Inc., Columbus, IN (US)

(72) Inventors: Apurva A. Chunodkar, Greenwood, IN (US); Zachary A. Knutson, Columbus, IN (US); Kenneth M. Follen, Greenwood, IN (US); Vivek A. Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 13 days.

(21) Appl. No.: 16/517,824

(22) Filed: Jul. 22, 2019

(65) Prior Publication Data
US 2019/0338849 A1    Nov. 7, 2019

Related U.S. Application Data

(63) Continuation of application No. PCT/US2018/014758, filed on Jan. 23, 2018.
(Continued)

(51) Int. Cl.
*F16H 61/02* (2006.01)
*B60W 30/14* (2006.01)
*B60W 50/00* (2006.01)

(52) U.S. Cl.
CPC ....... *F16H 61/0213* (2013.01); *B60W 30/143* (2013.01); *B60W 50/0097* (2013.01); *F16H 2061/022* (2013.01)

(58) Field of Classification Search
CPC .......... F16H 61/0213; F16H 2061/022; F16H 59/66; B60W 30/143; B60W 50/0097;
(Continued)

(56) References Cited

U.S. PATENT DOCUMENTS

| 6,990,401 B2 * | 1/2006 | Neiss ................. B60K 31/0058 |
| | | 701/96 |
| 7,921,945 B2 | 4/2011 | Harris |

(Continued)

FOREIGN PATENT DOCUMENTS

| WO | 2013034161 | 3/2013 |
| WO | 2013095237 | 6/2013 |

(Continued)

OTHER PUBLICATIONS

Search Report and Written Opinion, PCT Appln. No. PCT/U18/14758, dated Mar. 22, 2018, 7 pgs.

*Primary Examiner* — Tinh Dang
(74) *Attorney, Agent, or Firm* — Taft Stettinius & Hollister LLP

(57) ABSTRACT

A control system, apparatus, and method integrates vehicle speed management and predicted gear shifting of a vehicle by determining current and future engine power requirements from the current and forward-looking route conditions to improve performance, drivability, and/or fuel economy of the vehicle over what is achievable through conventional gear state selection via static calibration tables and conventional shifting strategies. The selection of the vehicle reference speed is responsive to a gear selection to provide increased fuel economy, decreased trip time or combinations thereof.

24 Claims, 23 Drawing Sheets

Related U.S. Application Data

(60) Provisional application No. 62/450,315, filed on Jan. 25, 2017.

(58) Field of Classification Search
CPC .... B60W 10/06; B60W 10/10; B60W 30/182; B60W 2552/15; B60W 2552/20; B60W 2720/10; B60W 2710/1005; Y02T 10/40
See application file for complete search history.

(56) References Cited

U.S. PATENT DOCUMENTS

| | | | |
|---|---|---|---|
| 8,452,509 B2 | 5/2013 | Sujan et al. | |
| 8,498,795 B2 | 7/2013 | Eriksson et al. | |
| 8,744,718 B2 | 6/2014 | Johansson et al. | |
| 8,855,874 B2 | 10/2014 | Eriksson et al. | |
| 9,096,229 B2 | 8/2015 | Eriksson et al. | |
| 9,108,639 B2 | 8/2015 | Johansson et al. | |
| 9,248,836 B2 | 2/2016 | Johansson et al. | |
| 9,297,455 B2 | 3/2016 | Li | |
| 9,352,650 B2 * | 5/2016 | Filev | B60W 30/143 |
| 9,352,750 B2 | 5/2016 | Johansson et al. | |
| 9,393,963 B2 * | 7/2016 | Slaton | B60W 50/085 |
| 9,440,654 B2 | 9/2016 | Atluri et al. | |
| 9,511,668 B2 | 12/2016 | Johansson et al. | |
| 2011/0106388 A1 | 5/2011 | Boeckenhoff et al. | |
| 2013/0030668 A1 * | 1/2013 | Eriksson | B60W 10/06 701/94 |
| 2015/0239454 A1 | 8/2015 | Sujan et al. | |
| 2015/0345621 A1 | 12/2015 | Sujan et al. | |

FOREIGN PATENT DOCUMENTS

| | | |
|---|---|---|
| WO | 2014149043 | 9/2014 |
| WO | 2016168213 | 10/2016 |

* cited by examiner

US 10,935,127 B2

SYSTEMS AND METHODS FOR PREDICTIVE GEAR SHIFTING AND INTEGRATED PREDICTIVE CRUISE CONTROL

RELATED APPLICATIONS

This application is a continuation application of PCT application Ser. No. PCT/US18/14758, filed Jan. 23, 2018, which claims priority to U.S. provisional patent application Ser. No. 62/450,315, filed Jan. 25, 2017, which are hereby incorporated by reference in their entireties.

BACKGROUND

The present disclosure relates to vehicle system apparatuses, methods and systems including integrated predictive gear shifting and predictive cruise control management ("PGSPCCM"). Traditionally, vehicles equipped with conventional automatic transmissions perform gear selection through static calibration (i.e., look-up) tables pre-programmed into a transmission control unit. As a result, during certain conditions, drivability, performance, trip time, and fuel economy of the vehicle can be negatively impacted by the calibrated gear selection. For example, under conventional transmission control, as the vehicle begins to climb or descend a hill, the transmission is generally not in the correct gear for the current power requirement. In the instance where the vehicle has begun to climb the hill, the gearing is generally too high and, as a result, the vehicle loses speed because the vehicle is under powered. In response, a conventional transmission control unit will down shift the transmission to gain access to greater power and recover to a desired or set cruising speed. Through such a transition, the vehicle loses additional speed due to the gear shift under load, further affecting drivability and fuel economy as the vehicle powers up to regain the desired speed. Moreover, under conventional vehicle speed control, the controller generally attempts to maintain a vehicle set speed regardless of whether the engine is or will be operating in an efficient region under the current engine power and speed requirements. Certain predictive gear shifting ("PGS") which seek to alter conventional transmission shifting behavior have been proposed. Certain predictive cruise control ("PCC") proposals which seek to alter conventional cruise control behavior have also been proposed. Yet the integration and interaction of PGS and PCC controls continues to pose a number of unmet challenges including those respecting operational efficiency of vehicle systems. There remains a significant need for the apparatuses, methods, and systems disclosed herein.

DISCLOSURE OF ILLUSTRATIVE EMBODIMENTS

For the purposes of promoting an understanding of the principles of the invention disclosed, reference will now be made to the embodiments illustrated in the drawings and specific language will be used to describe the same. It will nevertheless be understood that no limitation of the scope of the invention is thereby intended. Any alterations and further modifications in the illustrated embodiments, and any further applications of the principles of the invention as illustrated therein as would normally occur to one skilled in the art to which the invention relates, having the benefit of the present disclosure, are contemplated herein.

SUMMARY

Certain embodiments include unique vehicle systems including PGSPCCM controls. Certain embodiments include unique PGSPCCM control methods. Certain embodiments include unique electronic control systems implementing PGSPCCM controls. Further embodiments, forms, objects, features, advantages, aspects, and benefits shall become apparent from the following description and drawings.

DESCRIPTION OF ILLUSTRATIVE EMBODIMENTS

Figure 1:
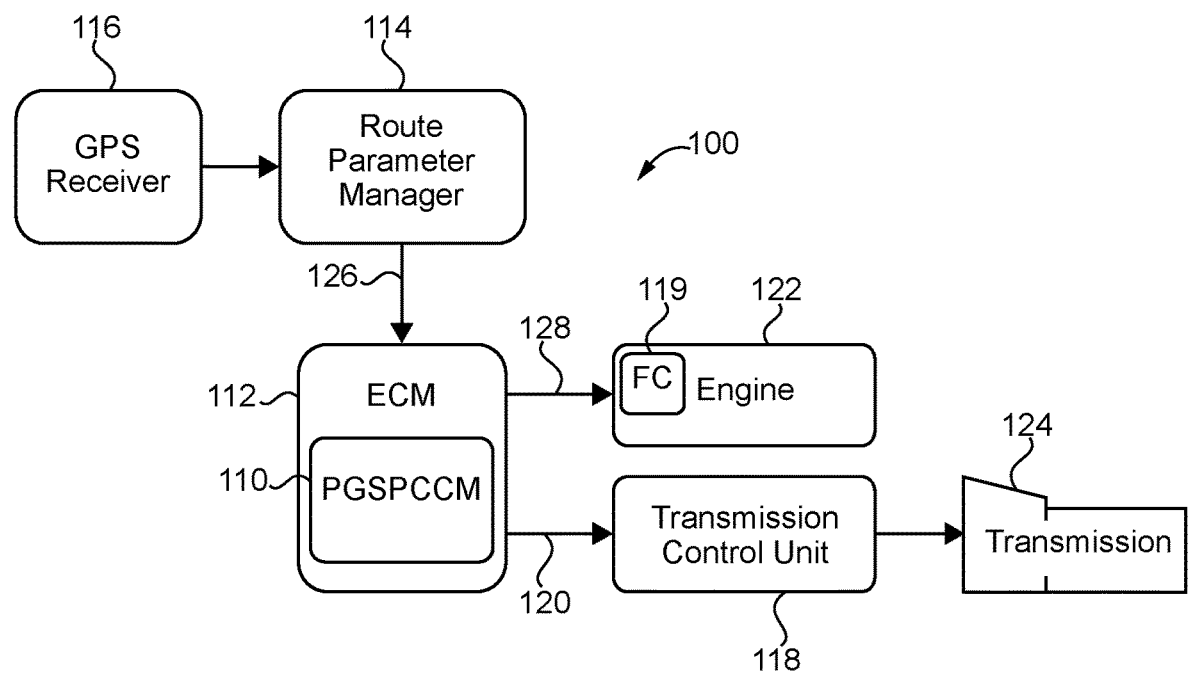
FIG. 1 is a schematic diagram of an exemplary vehicle system including PGSPCCM controls.

With reference to FIG. 1, there is illustrated an exemplary vehicle system 100 according to an exemplary hardware architecture. The hardware architecture shown in FIG. 1 is but one example, and the vehicle system 100 may encompass a number of other hardware architectures. The vehicle system 100 includes PGSPCCM controls including integrated PGS and PCC controls. These controls may be included in a PGSPCCM controller 110 configured to generate one or both of a gear request 120 and a vehicle reference speed 128 by performing predictive gear state management, vehicle speed management, and predictive cruise control management.

The PGSPCCM controller 110 may be incorporated into an electronic control unit (ECU) 112. In the illustrated embodiment ECU is provided as an electronic engine control module (ECM) configured to control a powertrain of the vehicle, including an engine 122 and/or a transmission 124, as shown in FIG. 1. Alternatively, the PGSPCCM controller 110 may be a separate control unit configured to interface with the ECU 112. PGS control logic, which may be implemented in the PGSPCCM controller 110 generates a transmission gear state request, hereinafter a gear request 120, which may be communicated to a transmission control unit (TCU) 118. The gear request 120 from the PGSPCCM controller 110 is interrogated by the TCU 118, which generates a gear command sent to the transmission 124 to shift the transmission 124 into the gearing prescribed by the gear command. Thus, the PGSPCCM controller 110 controls the gear state of the transmission 124, which may be any suitable type of transmission, including but not limited to an automatic, semi-automatic, manual, continuously variable, electric variable, planetary gear set, and dual-clutch transmission.

The PGSPCCM controller 110 may accept input from a route parameter manager 114, which can provide the PGSPCCM controller 110 with information concerning the conditions of the route taken by the vehicle, referred to herein and shown in FIG. 1 as route condition information 126. The route condition information 126 may include a current route condition and a forward route condition. The current route condition may include the conditions of the route at the current location of the vehicle along the route. The forward route condition may include the conditions of the route for a certain distance or period in front of the vehicle along the route. The route associated with the forward route condition may be a projected route. The projected route may be a route programmed into a navigation system of the vehicle, which may communicate with the route parameter manager 114. Alternatively, the projected route may be the route for a certain distance or period in front of the vehicle along its current trajectory. The distance or period in front of the vehicle along its current and projected route for which forward route condition information data is available to the PGSPCCM controller 110 may be referred to as a "look-ahead window." The range or size of the look-ahead window may be determined by such factors as the speed of the vehicle, the availability of route condition information, and the resolution of the route condition information. Under certain operating conditions, only the current route condition may be available.

For example, the route condition information 126 may include the current grade (i.e., change of elevation or pitch) of the road where the vehicle is along its current course (i.e., the current route condition). Moreover, the route condition information 126 may include the grade of the road for a certain distance along the projected route through the look-ahead window (i.e., the forward route condition). In such an embodiment, the route parameter manager 114 may provide the PGSPCCM controller 110 with look-ahead or forward grade information, which the PGSPCCM controller 110 may use to determine the gear request 120. The route condition information 126 may further include such information as traffic conditions, traffic control signs and signals, their type and location, posted and effective (i.e., actual travel rates) speed limits and, in certain embodiments, environmental conditions, such as precipitation and wind conditions.

Various aspects of the PGSPCCM controls may use the route condition information 126 to determine the projected engine power and speed requirements for the look-ahead window. The projected engine power and speed requirements may then be used to predict vehicle speed deviations. Such vehicle speed deviations may be due to changes in the terrain grade, traffic conditions, traffic control signs and signals and their location, speed limits or, in certain embodiments, environmental conditions, such as wind and precipitation conditions. The vehicle speed deviations may be, for example, from the vehicle set speed or the current vehicle speed. Based upon the determined engine power and speed requirements using the route condition information 126, the PGSPCCM controls communicate the prescribed gear request 120 to the TCU 118. The TCU 118 may act upon the gear request 120 if the TCU 118 determines it is safe or efficient to do so under the current engine speed and torque conditions, the vehicle speed, and/or other limiting operating conditions. For example, before acting upon the gear request 120, the TCU 118 may perform calculations to ensure the requested gear results in an engine and/or transmission speed that are within acceptable limits. Further, the specific timing of the gear state change and cruise control reference speeds may be affected by the vehicle speed, among other factors.

Examples of operating conditions under which the PGSPCCM controls may communicate the gear request 120 to the TCU 118 include, but are not limited to: gear downshift prior to a steep uphill event; gear upshift prior to a steep downhill event; gear downshift approaching a traffic signal; gear downshift or upshift in inclement weather; selection of a desired gear state during a steep uphill or downhill event such that sufficient engine power is available and/or such that the engine 122 operates in the best region of operating efficiency; and selection of a desired gear state such that the cumulative or overall drivability over at least a portion of the route is increased. Under certain instantaneous operating conditions, the selection and communication of a particular gear state may be sub-optimal under the present conditions. Nonetheless, the particular gear state may provide the optimal trade-off of performance and efficiency over the course of the cumulative route, or at least a portion thereof. For example, a particular gear state may temporarily lower the operating efficiency of the engine but improve the drivability of the vehicle through the look ahead window. Consequently, the gear state may be selected on the basis of the instantaneous operating metric or the cumulative or overall operating metric over the course of the route, depending on the configuration of the PGS control aspects.

Operating efficiency may be characterized by the brake specific fuel consumption (BSFC), the brake thermal efficiency (BTE) of the engine, or other suitable metrics under the given operating conditions. For the purpose of this disclosure, drivability may be quantified by various metrics that characterize the operation and performance of the powertrain and generally indicate the smoothness and steadiness of powertrain operation. As non-limiting examples, drivability may include frequency and timing of gear shift events, total number of gear shift events, acceleration capability (e.g., acceleration response within different vehicle speed ranges and/or on different grades), and ability to maintain a given vehicle speed on a given grade. General vehicle performance may also be characterized on the basis of fuel economy (i.e., miles per gallon of fuel consumed) and trip time.

Communication between the hardware components of the vehicle system 100, such as the route parameter manager 114, the PGSPCCM controller 110, and the TCU 118, may be conveyed via controlled area network (i.e., CAN bus) or any suitable communication protocol. In certain embodiments, the route parameter manager 114 may accept input from a global positioning system (GPS) receiver 116, which can provide the route parameter manager 114 with the route condition information, for example, the current latitude and longitude of the vehicle relative to available data of the terrain of the route. Such terrain data may be stored within a navigation system of the vehicle, may be accessed in real-time via mobile communication link, or mode available by any suitable means. In certain embodiments, the GPS receiver 116 and route parameter manager 114 may be a part of or separate from the navigation system of the vehicle. Alternatively, the GPS receiver 116 and route parameter manager 114 may be a part of the ECU 112 or may be disposed in a separate control module associated with the vehicle.

In certain embodiments, the route condition information may be provided to the PGSPCCM, PGS and/or PCC controls by an intelligent transportation system (ITS) or similar system. An ITS generally refers to the integration of information and communication technologies with transport infrastructure to improve economic performance, safety, mobility and environmental sustainability. An ITS may include real-time traffic information systems that collect data on traffic conditions, aggregate and translate the data, and disseminate the traffic data through various technologies. Such systems may enable dynamic route grade profiling through vehicle-to-vehicle communications, where grade information from preceding vehicles is provided to the route parameter manager 114. Similarly, vehicles in the proximity of the route may provide speed and gear state information indicative of traffic volume, actual traffic speeds, and other dynamic route condition information that the PGSPCCM controls may use to adjust the gear state and/or vehicle speed.

For example, the controls may determine that it is not desired to increase vehicle speed or change gear state where forward traffic or traffic control devices within the look-ahead window indicate that such changes would necessitate a braking event within a predetermined window. In a further example, where a speed increase or decrease is imminent based on information from the ITS, whether due to traffic, route grade, etc., the controls may determine the optimal gear state accordingly. In yet another example, the controls may coordinate multiple vehicles via the ITS to improve performance by platooning vehicles and selecting speeds and gear states to improve fuel efficiency and/or drivability of the vehicle fleet with respect to the route conditions. Thus, the route condition information may include data from other vehicles (e.g., via an ITS), and the controls may be configured to optimize the aggregate performance of more than one vehicle.

Further, the PGSPCCM controller 110 may communicate the determined vehicle reference speed 128 to a fuel control module 119 included in the engine 122. In certain embodiments, the fuel control module 119 may be included in the ECU 112. The fuel control module 119 subsequently interrogates the vehicle reference speed 128 and, if the fuel control module 119 determines it is safe or efficient to do so under the current vehicle and engine operating conditions, the fuel control module 119 may generate a fuel command to the engine 122 to adjust the fuel state of the engine 122, thus affecting its speed and the speed of the vehicle. In certain embodiments, the fuel control module 119 may include an air control to regulate the mass of air flowing into the engine 122. In such embodiments, the fuel control module 119 may generate an air command to the engine 122 to adjust the air state of the engine 122, thus affecting its speed and the speed of the vehicle. Accordingly, the PGSPCCM controller 110 may control both the gear state of the transmission 124 and the speed of the vehicle (via the speed of the engine 122 at the selected gear state) in concert with each other to improve performance, drivability, and/or fuel economy of the vehicle over what is achievable by controlling gear state and engine speed separately.

The PGSPCCM architectures disclosed herein provide the signals and flexibility for the PGSPCCM controls to request gear shifts and select vehicle speeds in an optimized manner. The optimized manner may be customized through calibration parameters to optimize a performance metric or metrics using criteria developed for various route conditions. Performance metrics may include, without being limited to, fuel economy, trip time, ability to maintain vehicle set speed on various grades, acceleration response over ranges of speed and grade, and number and frequency of shift events. Route conditions may include, without being limited to, uphill and downhill grade, weather conditions, traffic conditions, traffic control signs and signals and their location, and speed limits. The optimized manner and calibration may be determined offline, for example in an engineering laboratory setting, and/or through optimization routines such as dynamic programming.

The ECU 112 may be structured to control command parameters of the vehicle powertrain, including the engine 110 and/or the transmission 124. In certain embodiments, the ECU 112 may be a portion of a processing subsystem including one or more computing devices having memory, processing, and communication hardware. The ECU 112 may be a single device or a distributed device, and the functions of the ECU 112, including those of the PGSPCCM controller 110, may be performed by hardware or software. The ECU 112 may comprise digital circuitry, analog circuitry, or a hybrid combination of both of these types. The ECU 112 may include one or more Arithmetic Logic Units (ALUs), Central Processing Units (CPUs), memories, limiters, conditioners, filters, format converters, or the like which are not shown to preserve clarity.

Further, the ECU 112 may be programmable, an integrated state machine, or a hybrid combination thereof. In at least one embodiment, the ECU 112 is programmable and executes controls and processes data in accordance with operating logic that is defined by programming instructions such as software or firmware. Alternatively or additionally, operating logic for the ECU 112 may be at least partially defined by hardwired logic or other hardware. It should be appreciated that the ECU 112 may be exclusively dedicated to controlling the vehicle powertrain or may further be used in the regulation, control, and/or activation of one or more other subsystems or aspects of the vehicle.

Examples of systems, methods and apparatuses for controlling vehicle speed and/or gear state selection to improve vehicle performance can be found, for example, in U.S. patent application Ser. No. 14/719,917 filed on May 22, 2015 and U.S. patent application Ser. No. 14/625,951 filed on Feb. 19, 2015, each of which is incorporated herein by reference in its entirety.

Figure 2:
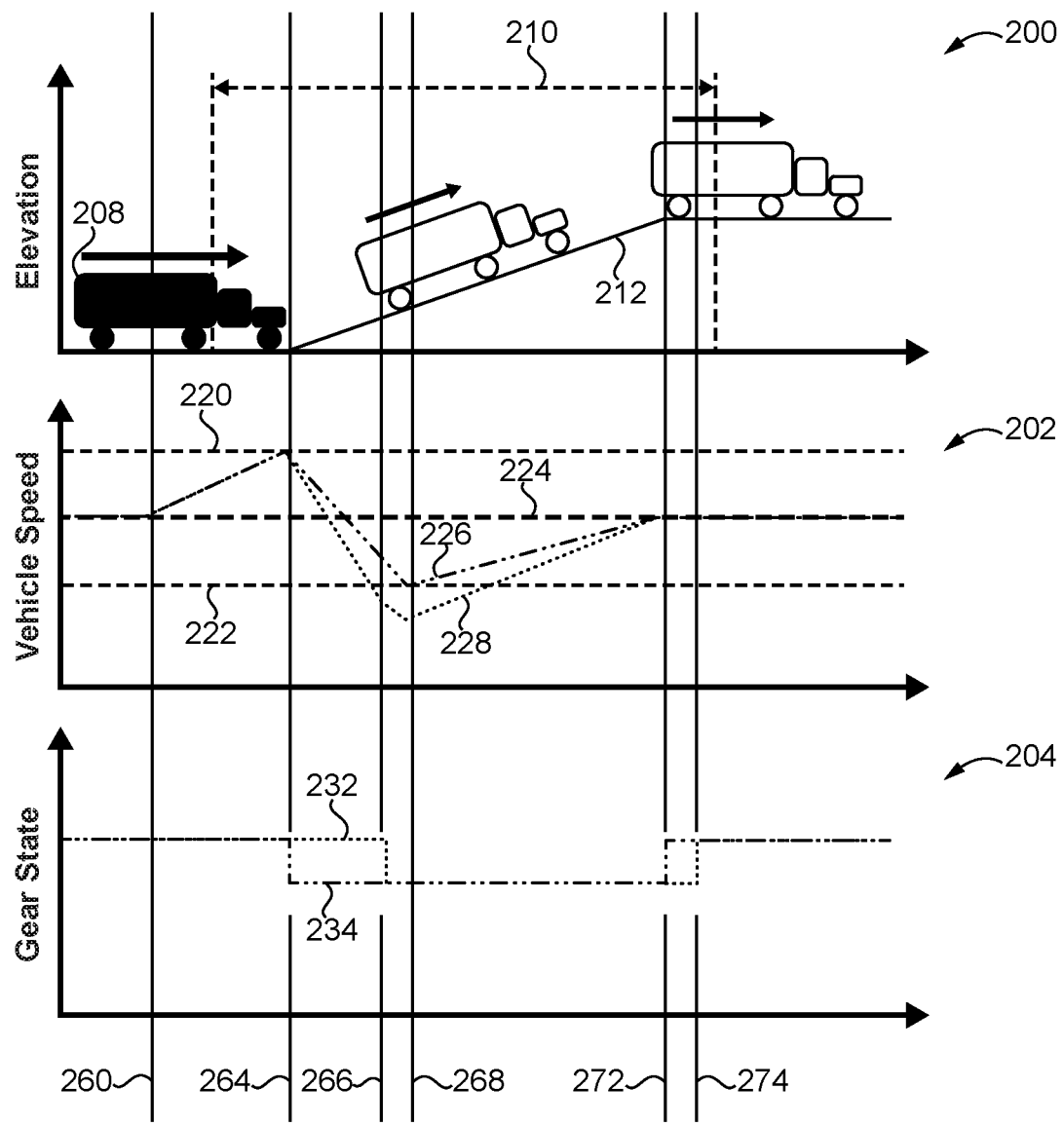
FIG. 2 depicts graphs illustrating velocity and gear state changes of a vehicle employing PGSPCCM controls.

Referring to FIG. 2 there are illustrated graphs 200, 202 and 204 depicting elevation, velocity and gear state changes, respectively, of a vehicle 208. Graph 202 depicts elevation on its vertical axis, distance along a vehicle operating route on its horizontal axis, and a curve 212 which indicates road grade over a look-ahead vehicle operating horizon 210. Graph 202 depicts vehicle speed on its vertical axis, distance along a vehicle operating route on its horizontal axis, and PGSPCCM control parameters including upper PCC vehicle speed threshold 220, lower PCC vehicle speed threshold 222, cruise reference speed 224. It shall be appreciated that upper PCC vehicle speed threshold 220, lower PCC vehicle speed threshold 222 and the other PCC vehicle speed thresholds define limits within which vehicle speed can vary while maintaining PCC operation and outside of which PCC operation may be aborted, cancelled suspended or terminated.

Graph 202 further depicts curve 228 which indicates vehicle speed of vehicle 208 without using PGSPCCM controls, and curve 226 which indicates vehicle speed of vehicle 208 using PGSPCCM controls. Graph 204 depicts transmission gear state on its vertical axis, distance along a vehicle operating route on its horizontal axis, curve 232 which indicates the gear state of vehicle 208 without using PGSPCCM controls, and curve 234 which indicates the gear state of vehicle 208 using PGSPCCM controls.

The effects using PGSPCCM controls are illustrated through a comparison of the operation of vehicle 208 indicated by curves 228 and 232 versus the operation of vehicle 208 indicated by curves 226 and 234. As illustrated by curves 228 and 232, when vehicle 208 operates without using PGSPCCM controls, a gear downshift occurs at distance 266 when the vehicle is in the midst of an uphill grade resulting in the vehicle speed profile indicated by curve 228. As illustrated by curves 226 and 234, when vehicle 208 operates using PGSPCCM controls, a gear downshift occurs at distance 264 before the vehicle reaches an uphill grade resulting in the vehicle speed profile indicated by curve 226. It can therefore be seen that the earlier down shift of curve 234 provides access to more power before an uphill road grade for active speed control by the PCC part of the control to maintain the lower vehicle speed at or above lower PCC vehicle speed threshold 222.

As illustrated in graph 202 projected vehicle speed 228 remains at cruise reference speed 224 until distance 260. From distance 260 projected vehicle speed 228 increases as vehicle 208 approaches incline 212 until distance 264 at which point vehicle 208 begins incline 212 and projected vehicle speed 228 is at or below upper PCC vehicle speed threshold 220. At distance 266 vehicle 208 downshifts gear 232 as shown in graph 204 after vehicle 208 starts incline 212. At distance 266 the projected vehicle speed 228 drops below lower PCC vehicle speed threshold 222. From distance 266 projected vehicle speed continues to decrease until distance 268. At distance 268 projected vehicle speed 228 increases as vehicle 208 moves up incline 212 until distance 272 at which point the road grade is zero. The gear state 232 upshifts at distance 274 after the projected vehicle speed 228 returns to cruise reference speed 224.

The velocity and gear state changes of vehicle 208 employing a conventional vehicle speed and transmission gear state control with the prior art PCC control modulates cruise reference speed for the vehicle within upper PCC vehicle speed threshold 220 and lower PCC vehicle speed threshold 222 thresholds. However as shown in graph 202 the prior art PCC control often has insufficient power to maintain vehicle speed within the vehicle speed thresholds, for example above lower PCC vehicle speed threshold 222, using a transmission shift schedule without look ahead route data 210.

The projected vehicle speed curve 226 with PGSPCCM maintains cruise reference speed 224 until distance 260. From distance 260 projected vehicle speed 226 increases as vehicle 208 approaches incline 212 until distance 264 at which point vehicle 208 begins incline 212 and projected vehicle speed 226 is at or below upper PCC vehicle speed threshold 220. At distance 264 PGSPCCM downshifts gear 234 as shown in graph 204 prior to vehicle 208 climbing incline 212. At distance 268 the projected vehicle speed 226 is at or above lower PCC vehicle speed threshold 222. From distance 268 projected vehicle speed 226 increases as vehicle 208 climbs incline 212 until distance 272 at which point the road grade is zero, gear 234 upshifts, and projected vehicle speed 226 returns to cruise reference speed 224.

As illustrated in graph 202 PGSPCCM modulates the cruise reference speed 224 within upper PCC vehicle speed threshold 220 and lower PCC vehicle speed threshold 222. Using conventional transmission shift schedule without look-ahead route data 210, the PCC alone may have insufficient power to maintain vehicle speed within the vehicle speed thresholds, as show in graph 202 with predicted speed 228 without PGSPCCM dropping below lower PCC vehicle speed threshold 222 due to downshift after vehicle 208 has begun incline 212. Graph 202 also shows predicted speed 226 with PGSPCCM stays within vehicle speed thresholds 220, 222 and is able to maintain power climbing incline 212 with the benefit of an earlier downshift at distance 264 providing access to power before starting an uphill road grade.

Figure 3:
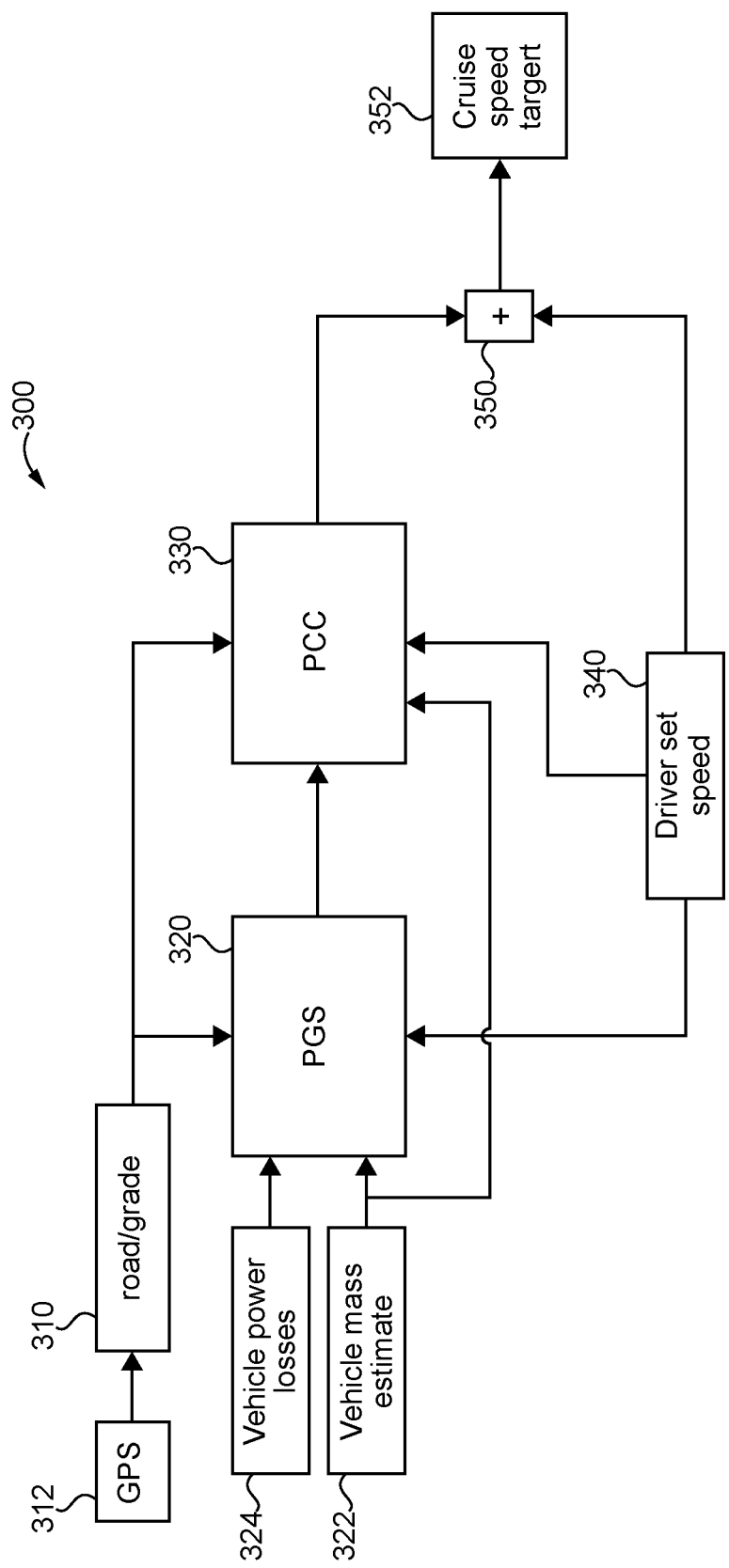
FIG. 3 is a block diagram of exemplary PGSPCCM controls.

FIG. 3 illustrates a block diagram of exemplary PGSPCCM controls 300 which may be implemented in and executed by one or more controllers such as PGSPCCM controller 110. PGSPCCM controls 300 include PGS control logic 320 which is configured to receive a plurality of inputs including a vehicle mass estimate 322, a vehicle power losses estimate 324, a driver set speed 340, and a road grade estimate 310 which may be determined using GPS input 312 provided by a GPS system and a GPS road grade database. PGS control logic 320 is configured to process the received inputs to determine and output a gear request. PGS control logic 320 determines a gear shift request in response to a road grade estimate 310, vehicle mass estimate 322 and vehicle power losses estimate 324. In certain embodiments, PGS control logic 320 determines a gear shift request to achieve desired vehicle velocity characteristics over a look-ahead operating horizon. In certain embodiments, PGS control logic 320 determines a gear shift request to achieve desired vehicle operating efficiency characteristics over a look-ahead operating horizon. In certain embodiments, PGS control logic 320 determines a gear shift request to achieve desired vehicle speed and vehicle operating efficiency characteristics over a look-ahead operating horizon.

Controls 300 include PCC control logic 330 which is configured to receive a plurality of inputs including the gear request from PGS control logic 320, the vehicle mass estimate 322, the road grade estimate 310, and the driver set speed 340. PCC control logic 330 is configured to determine and output a PCC speed reference delta. Operator 350 receives the PCC speed reference delta output by PCC control logic 330 and the driver set speed 340, sums the received inputs to determine and output a cruise speed target 352. In certain forms cruise target speed 352 may be constrained by one or more road speed limits. PCC control logic 330 determines a PCC speed reference delta in response to the gear request from PGS control logic 320, road grade estimate 310, vehicle mass estimate 322 and driver set speed 340. In certain embodiments, PCC control logic 330 determines a PCC speed reference delta to achieve desired vehicle velocity characteristics over a look-ahead operating horizon. In certain embodiments, PCC control logic 330 determines a PCC speed reference delta to achieve desired vehicle operating efficiency characteristics over a look-ahead operating horizon. In certain embodiments, PCC control logic 330 determines a PCC speed reference delta to achieve desired vehicle speed and vehicle operating efficiency characteristics over a look-ahead operating horizon.

Figure 4:
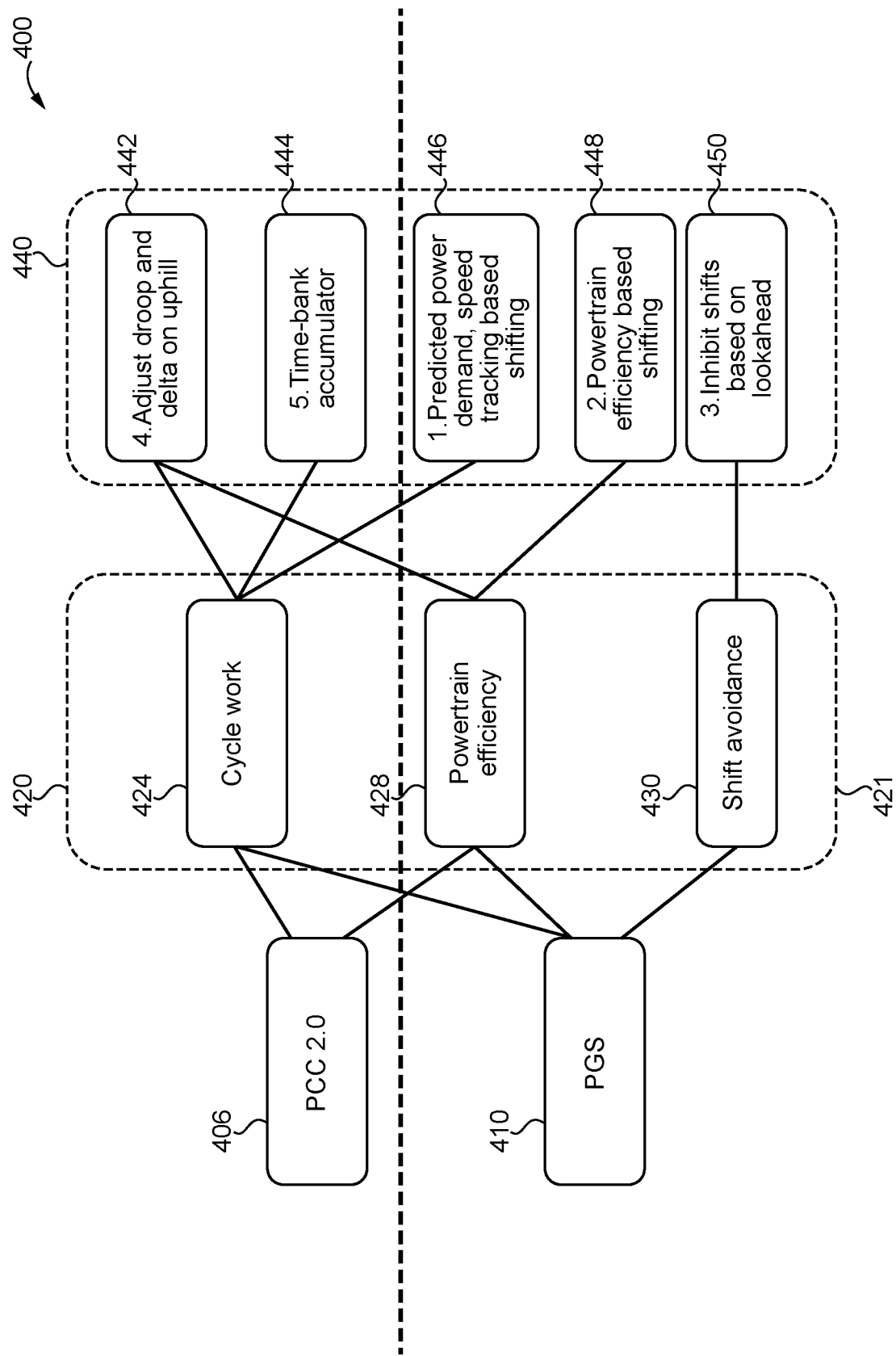
FIG. 4 is a block diagram of exemplary interactions between PGS controls and PCC controls and operational behaviors or outcomes for a vehicle system operating PGSPCCM controls.

FIG. 4 shows a diagram 400 of exemplary PGS controls 410 and PCC controls 406 interactions and operational behaviors or outcomes for a vehicle when such controls are employed. The PCC controls may provide speed management control 420 by reducing cycle work 424 and/or increasing power train efficiency 428 for a fuel efficiency and/or performance benefit. The PGS controls 410 may provide gear shifting control 421 by reducing cycle work 424, increasing powertrain efficiency 428 and shift avoidance 430 for a fuel efficiency and/or performance benefit. These benefits can be obtained by changing operational behaviors 440 such as, for example, predicted power demand or speed tracking based predictive gear shifting 446, powertrain efficiency based predictive gear shifting 448, inhibited gear shifting based on look ahead data 450, adjusting vehicle speed thresholds and speed changes on uphill segments 442, and accumulating time 444 by avoiding speed below lower limits to trade for fuel efficiency and performance improvements. Other operational behaviors are also contemplated.

Figure 5:
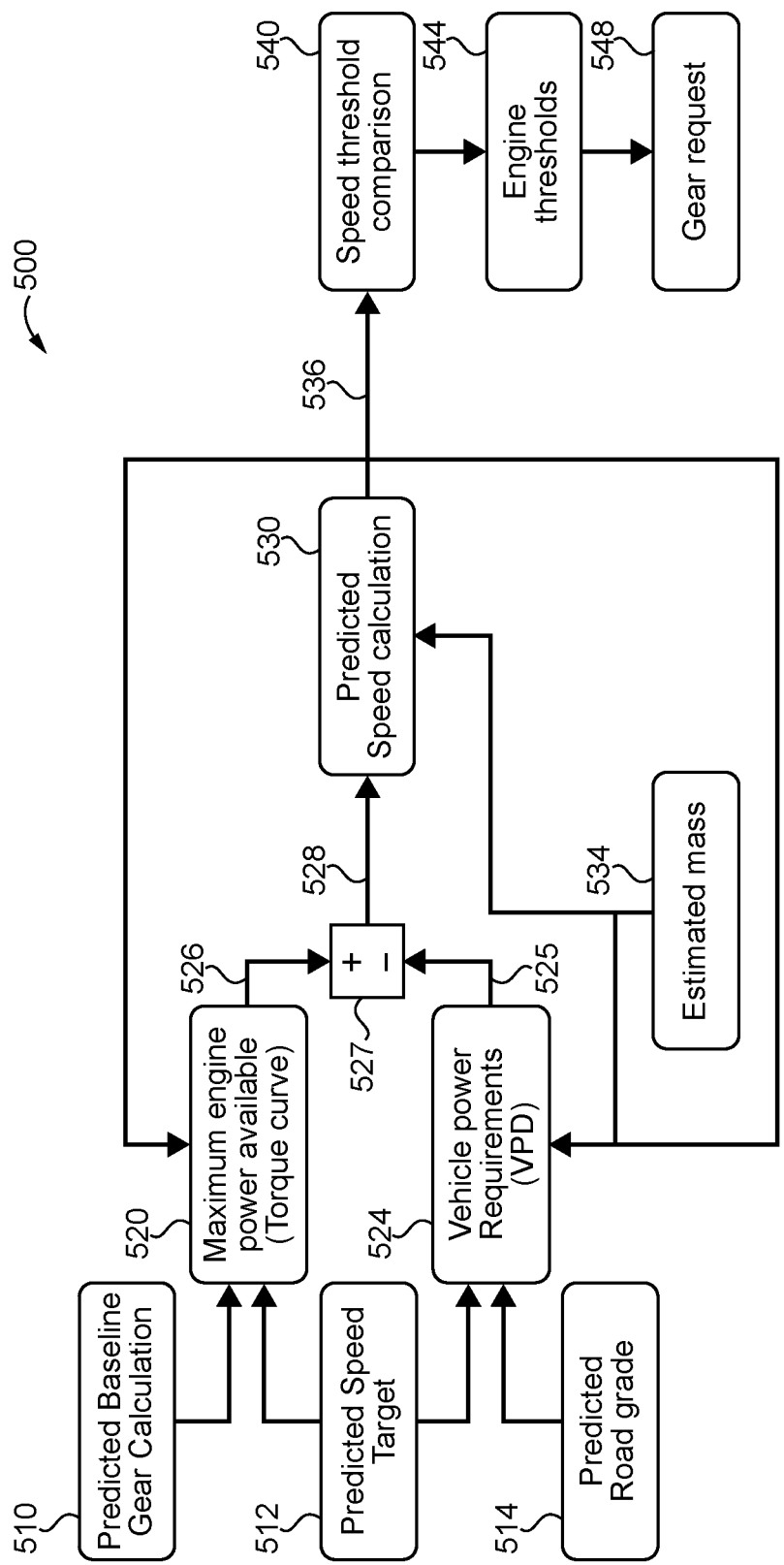
FIG. 5 is a block diagram of exemplary PGS controls aspects which may be included in exemplary PGSPCCM controls.

FIG. 5 illustrates a block diagram of certain aspects of PGS controls 500 which may be implemented in a controller such as PGSPCCM controller 110. PGS controls 500 provide predictive gear shifting based on predicted speed 536 and predicted power reserve 528. The inputs include predicted baseline gear calculation 510, predicted speed target 512 and predicted road grade. 510 and 512 are provided to maximum engine power available 520. Inputs 512 and 514 are provided to vehicle power requirements 524, and 520 and 524 provide predicted power reserve output 528. 528 is provided to predicted speed calculation 530. Estimated mass 534 is provided to 524 and 530. 530 output is provided to 520, 524 and speed threshold comparison 540. 540 output is provided to engine thresholds 544. 544 output is provided to gear request 548. The predicted power required 528 is compared to an available power to determine a predicted speed output 536 for the vehicle. Output 536 is provided to speed threshold 540, 520 and 524. A comparison of the predicted speed 536 to a speed threshold 540 is made, and then to engine thresholds 544 to determine a gear request 548. Other comparison metrics include, for example, energy reserve and normalized average power reserve.

More particularly, in PGS controls 500, operator 520 receives a predicted baseline gear calculation 510, a predicted vehicle speed target 512 and the output of operator 530 as inputs and determines and outputs a maximum engine power available 526. The maximum engine power available 526 may be determined based upon a predetermined torque curve, for example, using a lookup table. Operator 524 receives the predicted vehicle speed target 512, a predicted road grade 514, an estimated vehicle mass 534 and the output of operator 530 as inputs and determines and outputs a vehicle power requirement 525. Vehicle power requirement 525 may be determined using a physics-based model accounting for various loads imposed on the vehicle, for example, as disclosed in co-pending U.S. patent application Ser. No. 14/976,717 filed Dec. 21, 2015 the disclosure of which is hereby incorporated by reference. Operator 527 receives maximum engine power available 526 and vehicle power requirement 525 as inputs and determines and outputs a predicted power reserve 528. Operator 530 receives the predicted power reserve 528 and the estimated vehicle mass 534 as inputs and determines and outputs a predicted vehicle speed 536. Operator 540 receives the predicted vehicle speed 536, performs a speed threshold comparison and determines and outputs an initial gear request. Operator 544 receives the initial gear request from operator 540, evaluates the input relative to one or more engine thresholds or constraints and determines and outputs a final gear request 548.

Figure 6:
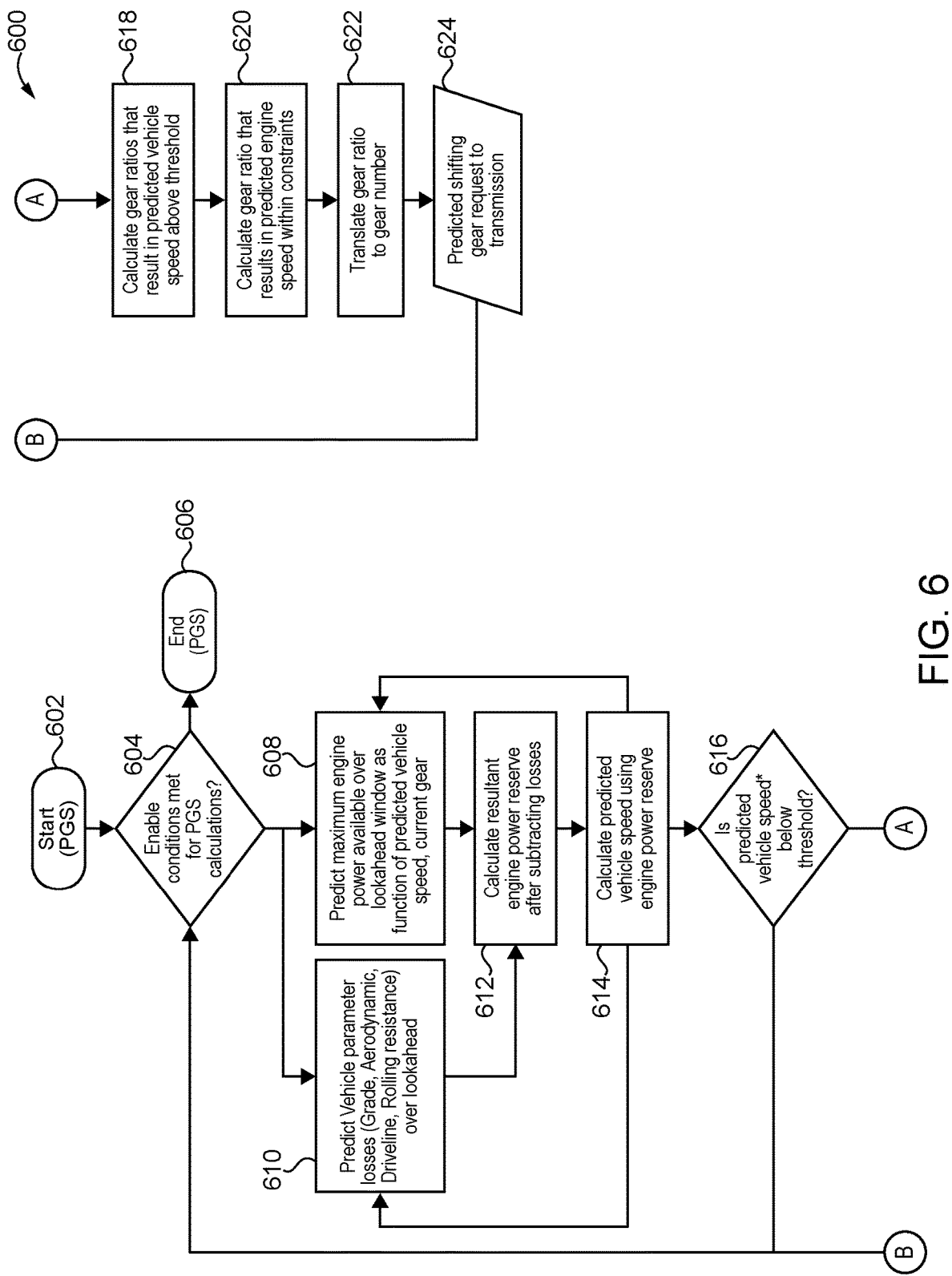
FIG. 6 is a flow diagram of exemplary PGS control method aspects which may be included in exemplary PGSPCCM control methods.

FIG. 6 illustrates a flow diagram of an exemplary control process 600 for a gear shifting strategy based on predicted speed and power reserve. Process 600 begins at start operation 602, and proceeds to conditional 604 which evaluates if enable conditions met for PGS calculations. If the enable conditions are not met, process 600 proceeds to end operation 606. If the enable conditions are met, process 600 proceeds in parallel to operator 608 and operator 610. Operator 608 predicts maximum engine power available over look-ahead window as function of predicted vehicle speed and current gear. Operator 610 predicts vehicle parameter losses including grade, aerodynamic, driveline, rolling resistance over look-ahead.

From operators 608 and 610 process 600 proceeds to operator 612 which calculates resultant engine power reserve after subtracting losses. Process 600 then proceeds to operator 614 which calculates predicted vehicle speed using engine power reserve. The process proceeds to operators 608, 610 and conditional 616 where it is determined if predicted vehicle speed is below threshold. If predicted speed is above threshold the process proceeds to conditional 604, if predicted speed is not above threshold the process proceeds to operator 618 which calculates gear ratios that result in predicted vehicle speed above threshold. The process proceeds to operator 620 which calculates gear ratio that results in predicted engine speed within constraints. The process proceeds to operator 622 to translate gear ratio to gear number. The process proceeds to operator 624 to send predicted shifting gear request to transmission. The process proceeds to conditional 604 to repeat or ends process.

Figure 7:
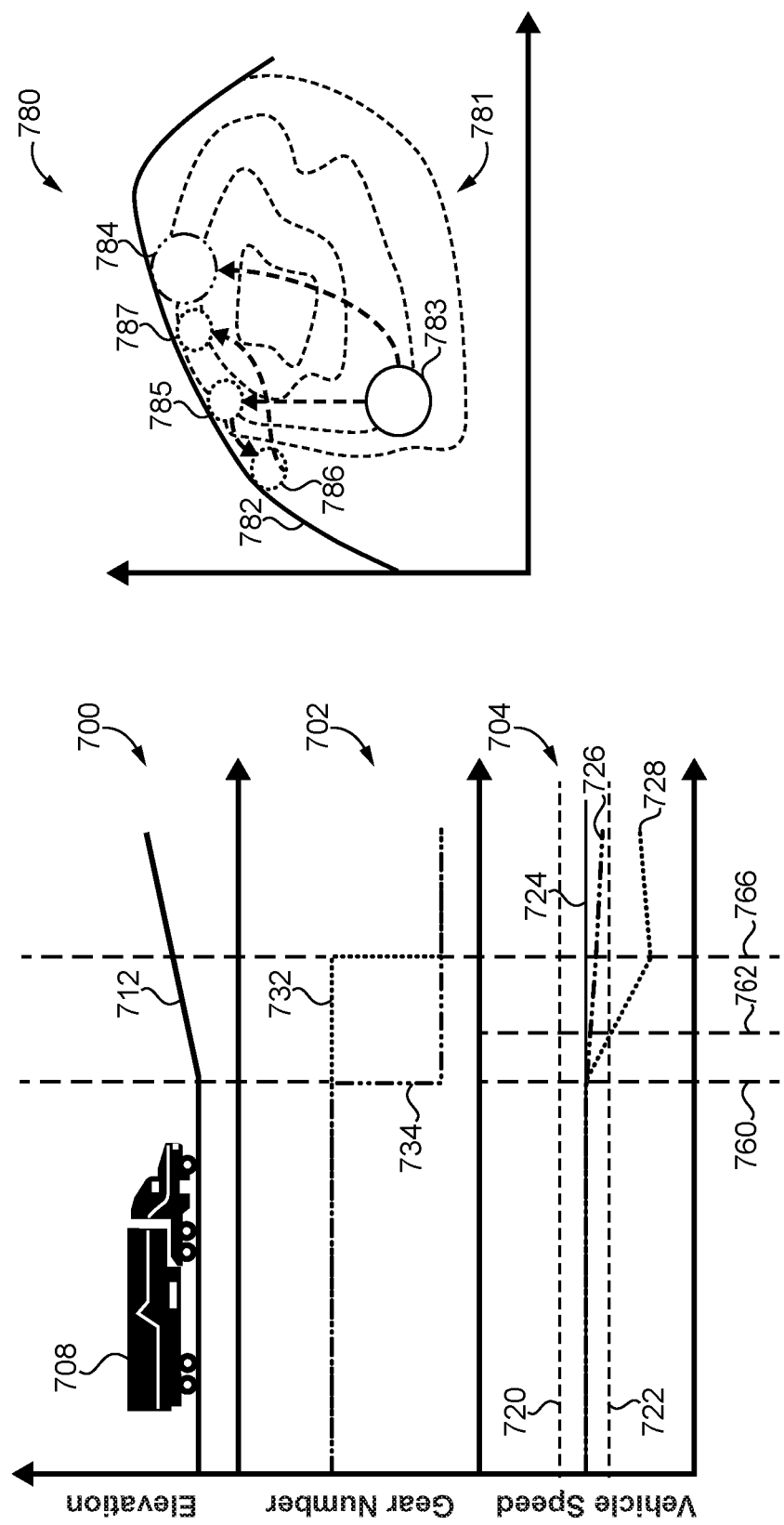
FIG. 7 depicts graphs illustrating the velocity and gear state changes, and engine efficiency changes, of a vehicle employing certain PGS controls aspects which may be included in PGSPCCM controls to avoid predicted lugback.

FIG. 7 illustrates the velocity and gear state changes of a vehicle employing PGSPCCM controls to avoid predicted lugback. When an uphill grade is predicted, the PGSPCCM controls downshift to a lower gear than would be nominally scheduled to avoid vehicle speed drops due to limited power operation. Potential inputs to the PGSPCCM controls include cruise speed upper PCC vehicle speed threshold width, vehicle mass, vehicle power requirements, predicted road grade, and a default or nominal shift schedule. An improved vehicle speed tracking and reduced trip time than would nominally occur in the default shift schedule is therefore provided, but a higher fuel consumption may result from higher cycle work.

FIG. 7 illustrates graphs 700, 702 and 704 depicting elevation, gear state changes and velocity, respectively, of a vehicle 708. Graph 700 depicts elevation on its vertical axis, and distance along a vehicle operating route on its horizontal axis. Graph 702 depicts transmission gear state on its vertical axis, distance along a vehicle operating route on its horizontal axis, curve 732 which indicates the gear state of vehicle 708 without using PGSPCCM controls, and curve 734 which indicates the gear state of vehicle 708 using PGSPCCM controls. Graph 704 depicts vehicle speed on its vertical axis, distance along a vehicle operating route on its horizontal axis, and PGSPCCM control parameters including upper PCC vehicle speed threshold 720, lower PCC vehicle speed threshold 722, cruise reference speed 724. Graph 702 further depicts curve 728 which indicates vehicle speed of vehicle 708 without using PGSPCCM controls, and curve 726 which indicates vehicle speed of vehicle 708 using PGSPCCM controls.

The effects using PGSPCCM controls are illustrated through a comparison of the operation of vehicle 708 indicated by curves 728 and 732 versus the operation of vehicle 708 indicated by curves 726 and 734. As illustrated by curves 728 and 732, when vehicle 708 operates without using PGSPCCM controls, a gear downshift occurs at distance 766 when the vehicle is in the midst of an uphill grade resulting in the vehicle speed profile indicated by curve 728. As illustrated by curves 726 and 734, when vehicle 708 operates using PGSPCCM controls, a gear downshift occurs at distance 760 before the vehicle reaches an uphill grade resulting in the vehicle speed profile indicated by curve 726. It can therefore be seen that an earlier 734 provides access to more power before an uphill road grade for active speed control by the PCC part of the control to maintain the lower vehicle speed at or above lower PCC vehicle speed threshold 722.

As illustrated in graph 704 projected vehicle speed 728 remains at cruise reference speed 724 until distance 760. From distance 760 projected vehicle speed 728 decreases as vehicle 708 moves up incline 712 until distance 762 at which point the projected vehicle speed 728 drops below lower PCC vehicle speed threshold 722. From distance 762 projected vehicle speed continues to decrease until distance 766. At distance 766 vehicle 708 downshifts gear 732 and the projected vehicle speed 728 increases as vehicle 708 moves up incline 712.

The velocity and gear state changes of vehicle 708 employing a conventional vehicle speed and transmission gear state control with the prior art PCC control modulates cruise reference speed for the vehicle within upper PCC vehicle speed threshold 720 and lower PCC vehicle speed threshold 722 thresholds. However as shown in graph 704 the prior art PCC control often has insufficient power to maintain vehicle speed within the vehicle speed thresholds, for example above lower PCC vehicle speed threshold 722.

The projected vehicle speed curve 726 with PGSPCCM as shown in graphs maintains cruise reference speed 724 until distance 760. At distance 760 PGSPCCM downshifts gear 734 as shown in graph 704 prior to vehicle 708 climbing incline 712 and vehicle speed 726 remains above lower PCC vehicle speed threshold 722 as vehicle 708 climbs incline 712.

As illustrated in graph 704 PGSPCCM modulates the cruise reference speed 724 within upper PCC vehicle speed threshold 720 and lower PCC vehicle speed threshold 722. Using conventional transmission shift schedule, the PCC alone may have insufficient power to maintain vehicle speed within the vehicle speed thresholds. As show in graph 704, predicted speed 728 without PGSPCCM drops below lower PCC vehicle speed threshold 722 while vehicle 708 is climbing incline 712. Graph 704 also shows predicted speed 726 with PGSPCCM within vehicle speed thresholds 720, 722 and is able to maintain power climbing incline 712 with the benefit of an earlier downshift at distance 760 providing access to power before starting an uphill road grade.

With continuing reference to FIG. 7 there is illustrated graph 780 depicting engine power on its vertical axis, engine speed on its horizontal axis, dashed lines showing engine BTE contours 781, and top gear torque curve 782. Graph 780 depicts vehicle 708 climbing incline 712 with and without PGSPCCM. Vehicle 708 climbing incline 712 without PGSPCCM experiences lug-back which includes lower performance and cycle work. The engine operating point of vehicle 708 starts at cruise on flat surface 783 and moves to first position 785 with engine power increase, then to a second position 786 with both decrease in engine power and engine speed, then to final position 787 with both increase in engine power and speed. Vehicle 708 climbing incline 712 with PGSPCCM avoids lug-back which includes higher performance and cycle work. The engine operating point of vehicle 708 starts at cruise on flat surface 783 and moves to final position 784 with increase in both engine power and engine speed. It shall be appreciated that graph 780 illustrates one example of how a number of shifts events can be reduced and the engine operating point can be maintained at higher net BTE by the use of PGSPCCM controls to avoid vehicle lugback.

Figure 8:
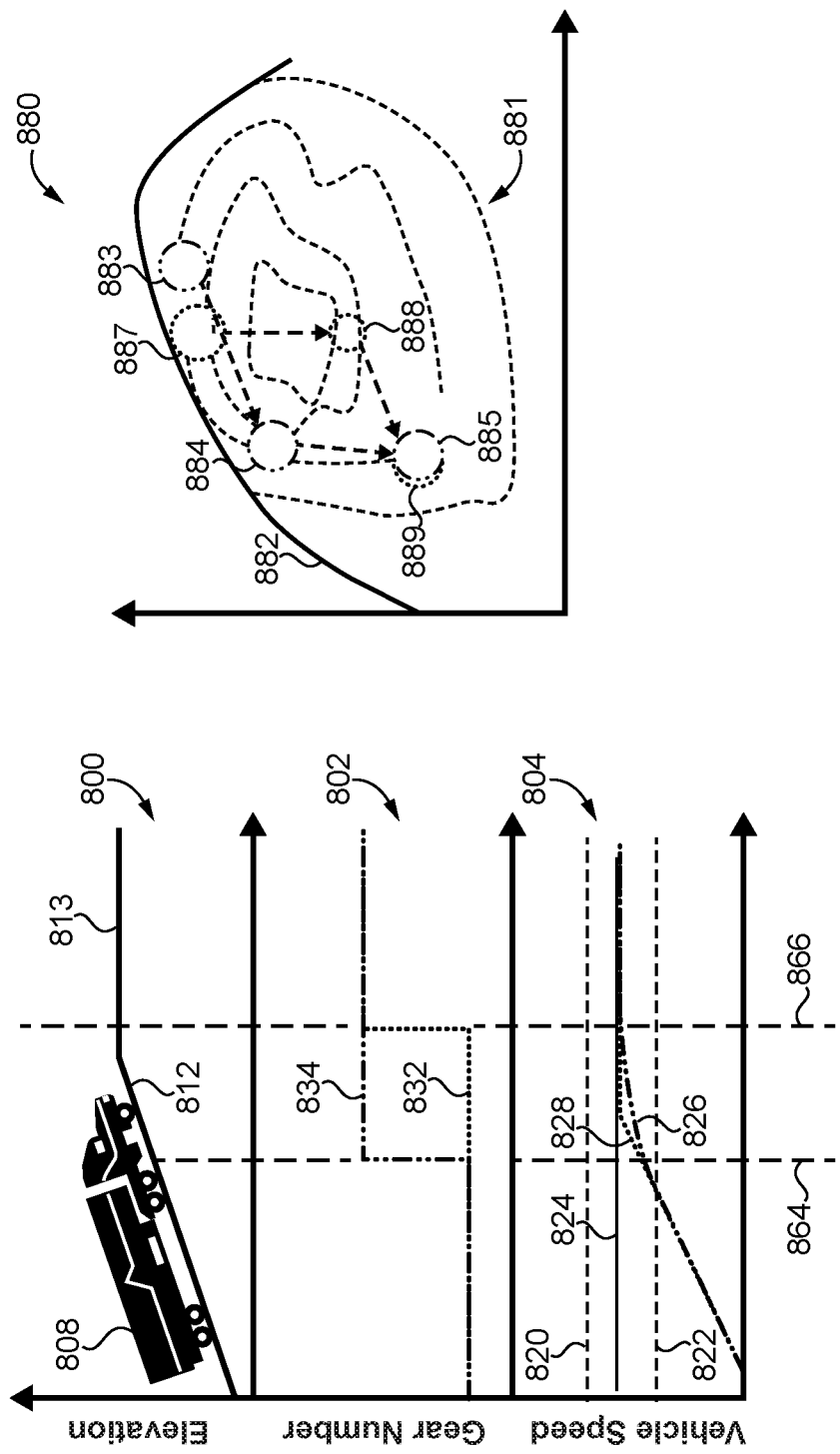
FIG. 8 depicts graphs illustrating the velocity and gear state changes, and engine efficiency changes, of a vehicle employing certain PGS controls aspects which may be included in exemplary PGSPCCM controls to upshift to a higher gear based on look ahead grade.

FIG. 8 illustrates the velocity and gear state changes of a vehicle employing the PGSPCCM controls to upshift to a higher gear based on look ahead grade when transitioning from a relatively steep or severe uphill grade to more moderate or flat grade. Potential inputs to the PGSPCCM controls include cruise speed upper PCC vehicle speed threshold width, vehicle mass, vehicle power requirements, predicted road grade, and a default or nominal shift schedule. An improved vehicle speed tracking and reduced trip time is therefore provided than would nominally occur in the default shift schedule, but a higher fuel consumption may result from higher cycle work.

FIG. 8 illustrates graphs 800, 802 and 804 depicting elevation, gear state changes and velocity, respectively, of a vehicle 808. Graph 800 depicts elevation on its vertical axis, and distance along a vehicle operating route on its horizontal axis. Graph 802 depicts transmission gear state on its vertical axis, distance along a vehicle operating route on its horizontal axis, curve 832 which indicates the gear state of vehicle 808 without using PGSPCCM controls, and curve 834 which indicates the gear state of vehicle 808 using PGSPCCM controls. Graph 804 depicts vehicle speed on its vertical axis, distance along a vehicle operating route on its horizontal axis, and PGSPCCM control parameters including upper PCC vehicle speed threshold 820, lower PCC vehicle speed threshold 822, cruise reference speed 824. Graph 804 further depicts curve 828 which indicates vehicle speed of vehicle 808 without using PGSPCCM controls, and curve 826 which indicates vehicle speed of vehicle 808 using PGSPCCM controls.

The effects using PGSPCCM controls are illustrated through a comparison of the operation of vehicle 808 indicated by curves 828 and 832 versus the operation of vehicle 808 indicated by curves 826 and 834. As illustrated by curves 828 and 832, when vehicle 808 operates without using PGSPCCM controls, a gear upshift occurs at distance 866 when the vehicle is in the midst of finishing an uphill grade resulting in the vehicle speed profile indicated by curve 828. As illustrated by curves 826 and 834, when vehicle 808 operates using PGSPCCM controls, a gear upshift occurs at distance 864 while vehicle 808 climbs an uphill grade 812 resulting in the vehicle speed profile indicated by curve 826. It can therefore be seen that an earlier 834 provides access to more power while climbing an uphill road grade for active speed control by the PCC part of the control.

Referring to FIG. 8 there is illustrated graph 880 depicting engine power on its vertical axis, engine speed on its horizontal axis, dashed lines showing engine BTE contours 881, and top gear torque curve 882. Graph 880 depicts vehicle 808 transitioning from a relatively steep or severe uphill grade to more moderate or flat grade with and without PGSPCCM controls. Vehicle 808 climbing incline 812 without PGSPCCM experiences greater time and fuel in lower gear. Without PGSPCCM the engine operating point of vehicle 808 starts at first position 887 and moves to second position 888 with less engine power and relatively constant engine speed, then to final position 889 with both decreases in engine power and speed. Vehicle 808 climbing incline 812 with PGSPCCM experiences less time and fuel in lower gear. With PGSPCCM, the engine operating point of vehicle 808 starts at a different initial position 883 and moves to second position 884 with decrease in engine speed and small decrease in engine power, then to final position 885 with decrease in engine power and relatively constant engine speed.

Figure 9:
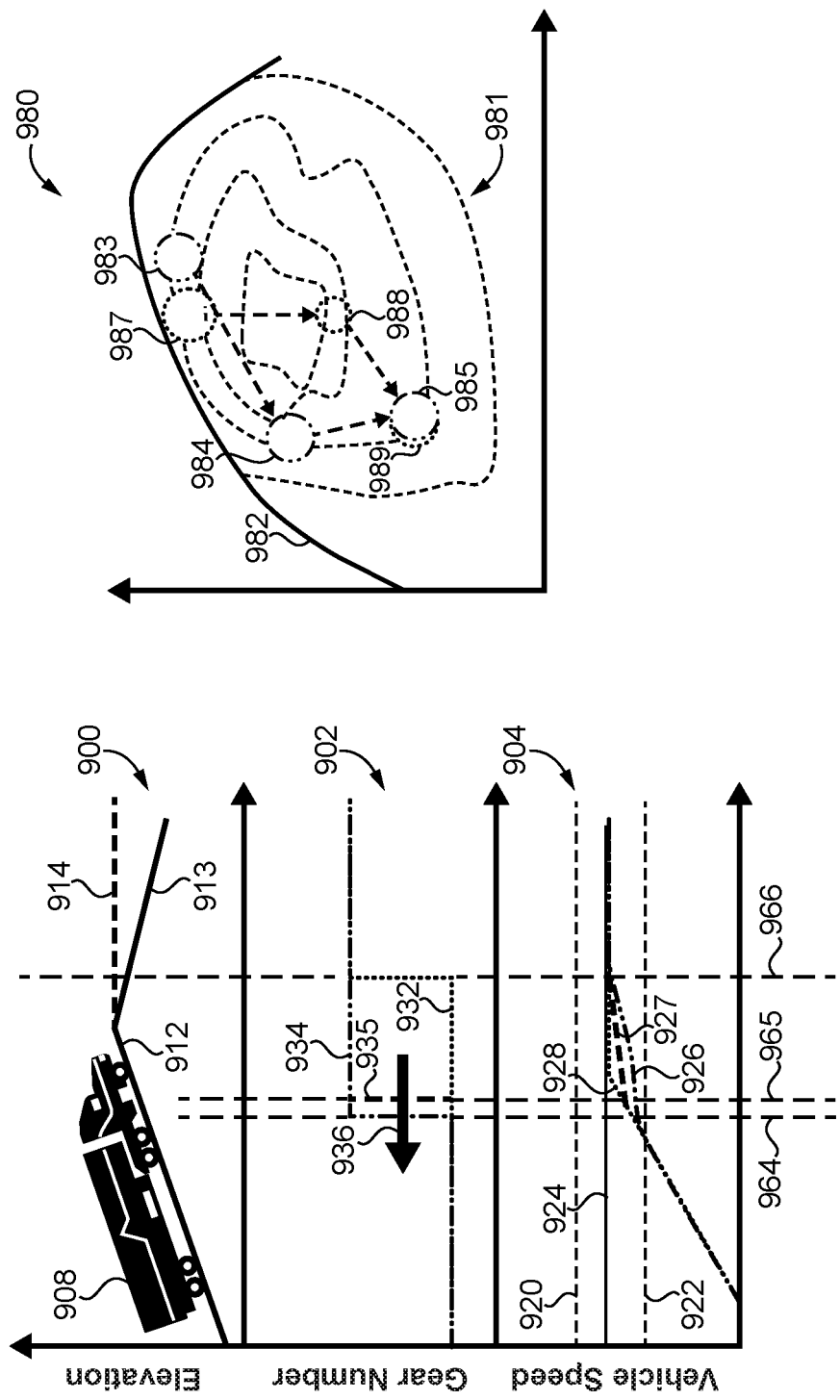
FIG. 9 depicts graphs illustrating the velocity and gear state changes, and engine efficiency changes, of a vehicle employing certain PGS controls aspects which may be included in exemplary PGSPCCM controls to upshift to a higher gear based on look ahead grade.

FIG. 9 illustrates the velocity and gear state changes of a vehicle employing PGSPCCM controls to upshift to a higher gear based on look ahead grade when transitioning from a relatively steep or severe uphill grade to a downhill grade. System parameters include a default shift schedule, vehicle mass, vehicle power requirements, and engine speed constraints. The PGSPCCM changes the shift point based on upcoming grade rather than a transmission efficiency difference and spends less time and fuel in the lower gear than would nominally occur based on the default shift schedule or the shift schedule for a subsequent flat route segment. System parameters may include a default shift schedule, vehicle mass, vehicle power requirements, and engine speed constraints. The PGSPCCM provides an earlier upshift to resulting in less time and fuel in the lower gear than would nominally occur based on the default shift schedule.

FIG. 9 illustrates graphs 900, 902 and 904 depicting elevation, gear state changes and velocity, respectively, of a vehicle 908. Graph 900 depicts elevation on its vertical axis, and distance along a vehicle operating route on its horizontal axis. Graph 902 depicts transmission gear state on its vertical axis, distance along a vehicle operating route on its horizontal axis, curve 932 which indicates the gear state of vehicle 908 without using PGSPCCM controls, curve 934 which indicates the gear state of vehicle 908 using PGSPCCM controls, and curve 935 which indicates transmission efficiency difference of shift point not based on upcoming grade. Graph 904 depicts vehicle speed on its vertical axis, distance along a vehicle operating route on its horizontal axis, and PGSPCCM control parameters including upper PCC vehicle speed threshold 920, lower PCC vehicle speed threshold 922, cruise reference speed 924. Graph 904 further depicts curve 928 which indicates vehicle speed of vehicle 908 without using PGSPCCM controls, curve 926 which indicates vehicle speed of vehicle 908 using PGSPCCM controls, and curve 927 which indicates impact of transmission efficiency difference on vehicle speed of vehicle 908.

The effects using PGSPCCM controls are illustrated through a comparison of the operation of vehicle 908 indicated by curves 928 and 932 versus the operation of vehicle 908 indicated by curves 926 and 934. As illustrated by curves 928, 932, and 935 when vehicle 908 operates without using PGSPCCM controls, a gear upshift occurs at distance 966 when the vehicle is in the midst of a downhill portion of grade 912 resulting in the vehicle speed profile indicated by curve 928. As illustrated by curves 926 and 934, when vehicle 908 operates using PGSPCCM controls, a gear upshift occurs at distance 964 before the vehicle starts a downhill grade segment 913 resulting in the vehicle speed profile indicated by curve 926, when vehicle 908 operates based on transmission efficiency, a gear shift occurs at distance 965 before the vehicle starts downhill portion of grade 912 resulting in the vehicle speed profile indicated by curve 927. It can therefore be seen that an earlier 934 provides access to more power while climbing an uphill road grade before starting a downhill grade for active speed control by the PCC part of the control.

Referring to FIG. 9 there is illustrated graph 980 depicting engine power on its vertical axis, engine speed on its horizontal axis, dashed lines showing engine BTE contours 981, and top gear torque curve 982. Graph 980 depicts vehicle 908 climbing incline 912 with and without PGSPCCM controls. Vehicle 908 climbing incline transitioning to decline without PGSPCCM experiences greater time and fuel in lower gear. Without PGSPCCM the engine operating point of vehicle 908 starts at first position 987 and moves to second position 988 with less engine power and relatively constant engine speed, then to final position 989 with both decrease in engine power and speed. Vehicle 908 climbing incline 912 with PGSPCCM experiences less time and fuel in lower gear. With PGSPCCM the operating point of vehicle 908 starts at first position 983 and moves to second position 984 with decrease in engine speed and small decrease in engine power, then to final position 985 with decrease in engine power and engine speed slightly increase.

Figure 10:
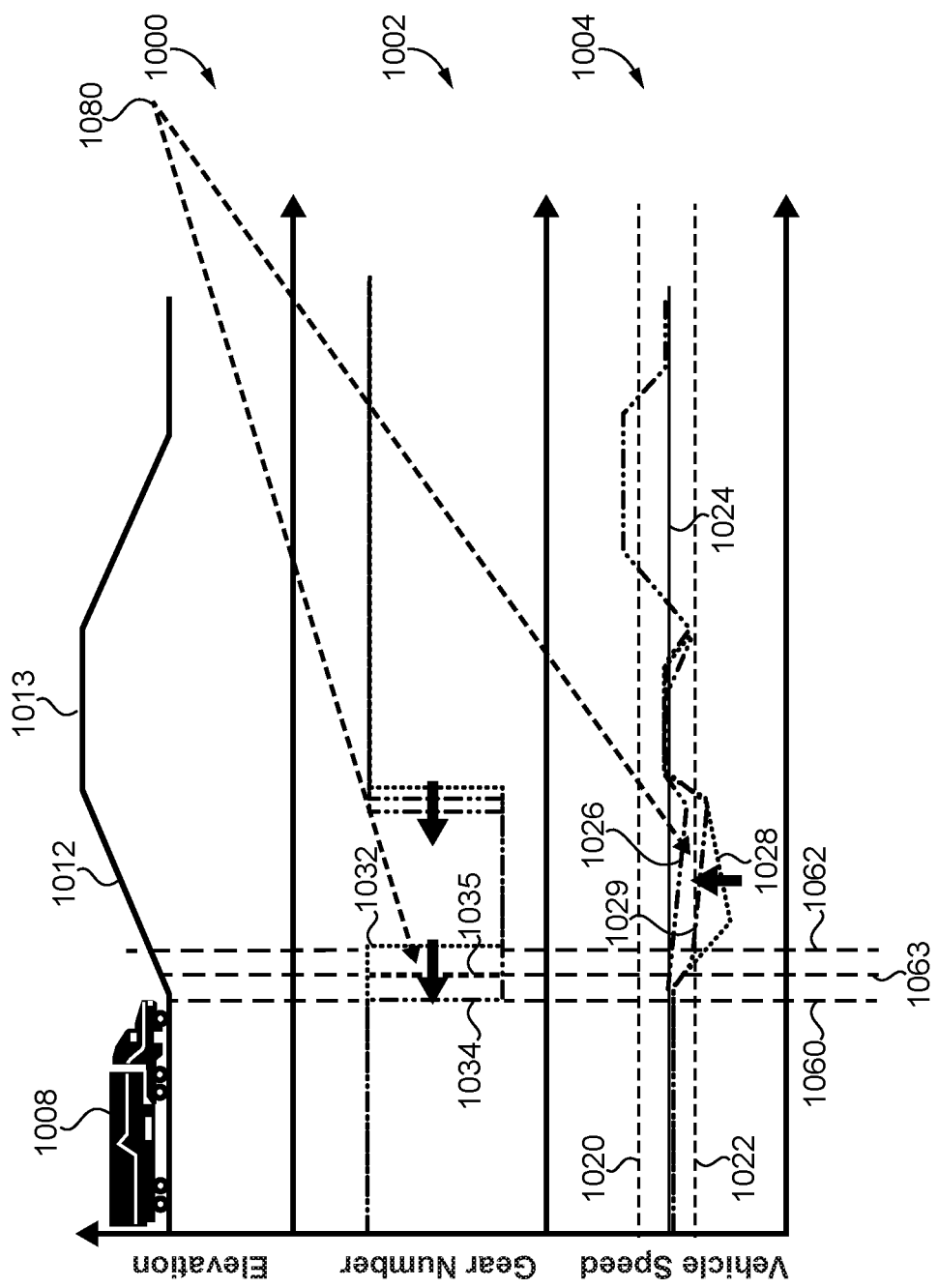
FIG. 10 depicts graphs illustrating the effect of a baseline shift schedule on available performance improvements.

FIG. 10 illustrates the effect of a baseline shift schedule on available performance improvements. An aggressive baseline shift schedule provides less opportunity for performance improvements through PGS control. FIG. 10 illustrates the velocity and gear state changes of a vehicle employing PGSPCCM controls to upshift to a higher gear based on look ahead grade when transitioning from a relatively steep or severe uphill grade to a moderate or flat grade to a relatively steep or severe downhill grade. A more aggressive baseline shift schedule 1080 results in less opportunity for performance improvements by utilizing PGSPCCM controls.

FIG. 10 illustrates graphs 1000, 1002 and 1004 depicting elevation, gear state changes and velocity, respectively, of a vehicle 1008. Graph 1000 depicts elevation on its vertical axis, and distance along a vehicle operating route on its horizontal axis. Graph 1002 depicts transmission gear state on its vertical axis, distance along a vehicle operating route on its horizontal axis, curve 1032 which indicates the gear state of vehicle 1008 without using PGSPCCM controls, curve 1034 which indicates the gear state of vehicle 1008 using PGSPCCM controls, and curve 1035 which indicates an aggressive baseline shift schedule 1080. Graph 1004 depicts vehicle speed on its vertical axis, distance along a vehicle operating route on its horizontal axis, and PGSPCCM control parameters including upper PCC vehicle speed threshold 1020, lower PCC vehicle speed threshold 1022, cruise reference speed 1024. Graph 1004 further depicts curve 1028 which indicates vehicle speed of vehicle 1008 without using PGSPCCM controls, curve 1026 which indicates vehicle speed of vehicle 1008 using PGSPCCM controls, and curve 1029 which indicates vehicle speed of vehicle 1008 using aggressive baseline shift schedule 1080.

The effects of variation in baseline shift schedule are illustrated through a comparison of the operation of vehicle 1008 indicated by curves 1028 and 1032 versus the operation of vehicle 1008 indicated by curves 1026 and 1034 versus the operation of vehicle 1008 indicated by curves 1029 and 1035. As illustrated by curves 1028 and 1032, when vehicle 1008 operates without using PGSPCCM controls, a gear downshift occurs at distance 1063 when the vehicle is in the midst of an uphill grade 1012 resulting in the vehicle speed profile indicated by curve 1028. As illustrated by curves 1026 and 1034, when vehicle 1008 operates using PGSPCCM controls, a gear downshift occurs at distance 1060 before the vehicle starts an uphill grade 1012 resulting in the vehicle speed profile indicated by curve 1026. As illustrated by curves 1029 and 1035, when vehicle 1008 operates using an aggressive baseline shift schedule, a gear downshift occurs at distance 1063 while vehicle in midst of climbing uphill grade 1012 resulting in the vehicle speed profile indicated by curve 1029. It can therefore be seen that curve 1034 provides access to more power while climbing an uphill road grade before starting a downhill grade for active speed control by the PCC part of the control. This benefit is present relative to both a standard baseline shift schedule as indicated by curves 1032 and 1028 and a more aggressive baseline shift schedule as indicated by curves 1035 and 1029.

Figure 11:
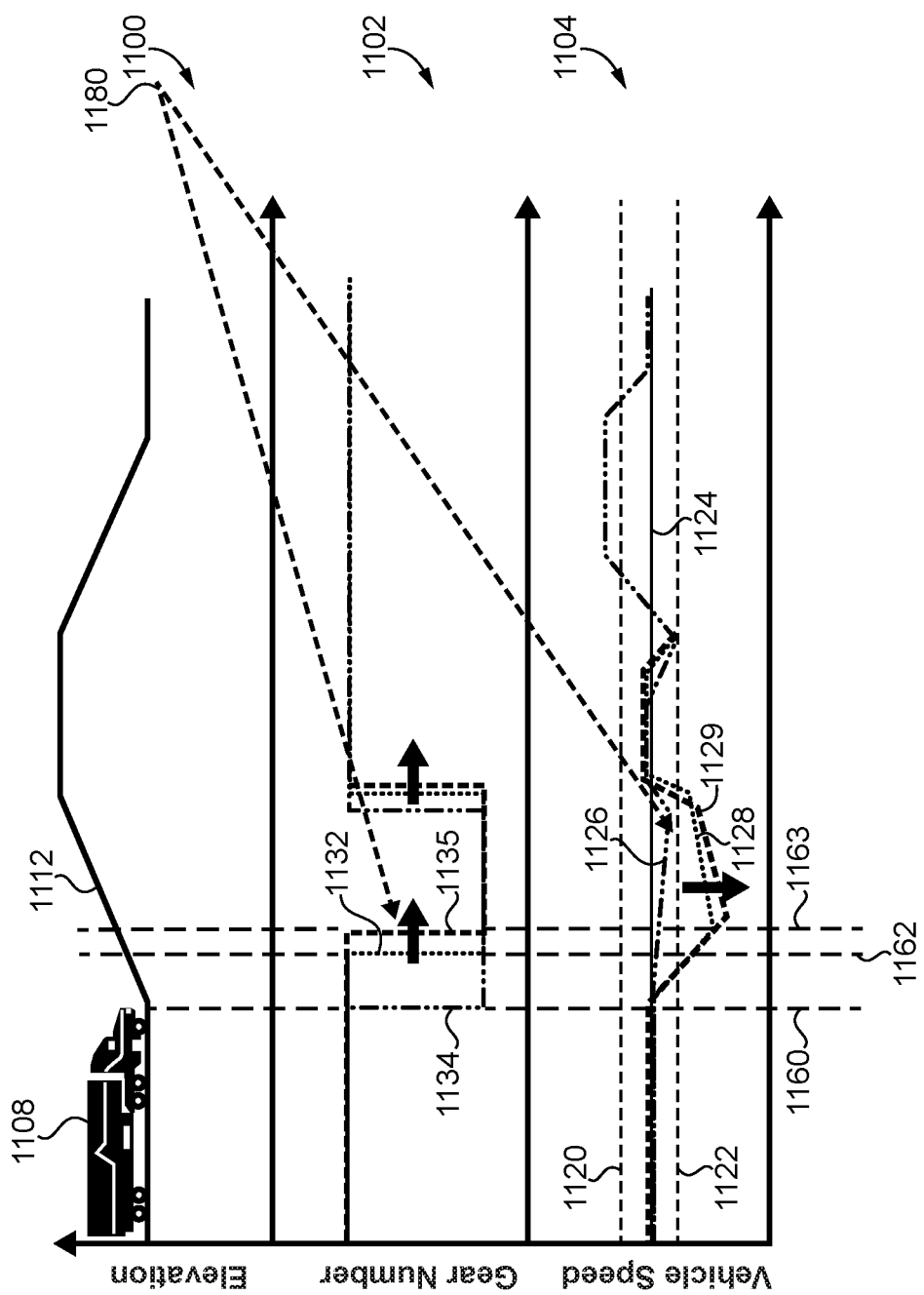
FIG. 11 depicts graphs illustrating the effect of a less aggressive baseline shift schedule on available performance improvements.

FIG. 11 shows the effect of a less aggressive baseline shift schedule which provides greater opportunities for performance improvements. FIG. 11 illustrates the effect of a baseline shift schedule on available performance improvements. A less aggressive baseline shift schedule results in greater opportunity for performance improvements through PGS control. FIG. 11 illustrates the velocity and gear state changes of a vehicle employing PGSPCCM controls to downshift to a lower gear based on look ahead grade when transitioning from a relatively steep or severe uphill grade to a moderate or flat grade to a relatively steep or severe downhill grade. A less aggressive baseline shift schedule 1180 results in more opportunity for performance improvements by utilizing PGSPCCM controls.

FIG. 11 illustrates graphs 1100, 1102 and 1104 depicting elevation, gear state changes and velocity, respectively, of a vehicle 1108. Graph 1100 depicts elevation on its vertical axis, and distance along a vehicle operating route on its horizontal axis. Graph 1102 depicts transmission gear state on its vertical axis, distance along a vehicle operating route on its horizontal axis, curve 1132 which indicates the gear state of vehicle 1108 without using PGSPCCM controls, curve 1134 which indicates the gear state of vehicle 1108 using PGSPCCM controls, and curve 1135 which indicates an aggressive baseline shift schedule 1180. Graph 1004 depicts vehicle speed on its vertical axis, distance along a vehicle operating route on its horizontal axis, and PGSPCCM control parameters including upper PCC vehicle speed threshold 1120, lower PCC vehicle speed threshold 1122, cruise reference speed 1124. Graph 1104 further depicts curve 1128 which indicates vehicle speed of vehicle 1108 without using PGSPCCM controls, curve 1126 which indicates vehicle speed of vehicle 1108 using PGSPCCM controls, and curve 1129 which indicates vehicle speed of vehicle 1108 using aggressive baseline shift schedule 1180.

The effects of variation in baseline shift schedule are illustrated through a comparison of the operation of vehicle 1108 indicated by curves 1128 and 1132 versus the operation of vehicle 1108 indicated by curves 1126 and 1134 versus the operation of vehicle 1008 indicated by curves 1129 and 1135. As illustrated by curves 1128 and 1132, when vehicle 1108 operates without using PGSPCCM controls, a gear downshift occurs at distance 1162 when the vehicle is in the midst of an uphill grade 1112 resulting in the vehicle speed profile indicated by curve 1128. As illustrated by curves 1126 and 1134, when vehicle 1108 operates using PGSPCCM controls, a gear downshift occurs at distance 1160 before the vehicle starts an uphill grade 1112 resulting in the vehicle speed profile indicated by curve 1126. As illustrated by curves 1129 and 1135, when vehicle 1108 operates using a less aggressive baseline shift schedule, a gear downshift occurs at distance 1163 while vehicle in midst of climbing uphill grade 1112 resulting in the vehicle speed profile indicated by curve 1129. It can therefore be seen that a less aggressive baseline shift schedule results in greater opportunity for performance.

Figure 12:
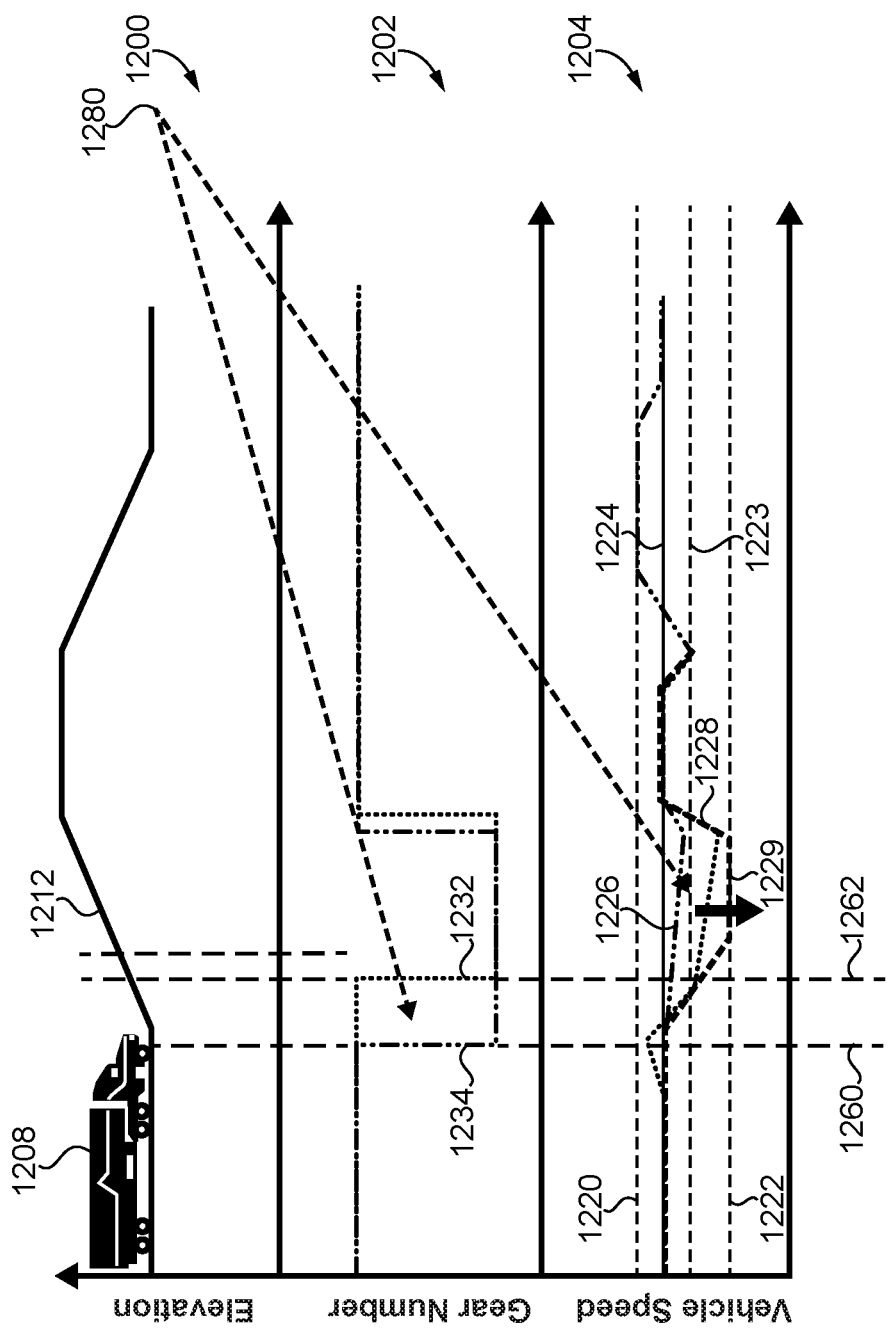
FIG. 12 depicts graphs illustrating the effect of variation in a lower PCC vehicle speed threshold on performance and fuel economy.

FIG. 12 shows the effect of a variation in PCC vehicle speed thresholds on performance and fuel economy. In particular, a greater width between upper and lower PCC vehicle speed thresholds can provide greater opportunity for improving performance at a cost of fuel efficiency. FIG. 12 illustrates the effect of variation in a lower PCC vehicle speed threshold providing greater opportunity for improving performance at cost of fuel economy. FIG. 12 illustrates the velocity and gear state changes of a vehicle employing PGSPCCM controls to downshift to a lower gear based on look ahead grade when transitioning from a relatively steep or severe uphill grade to a moderate or flat grade to a relatively steep or severe downhill grade. Under the illustrated operation conditions lowering the lower PCC vehicle speed threshold provides greater opportunity for improving performance at the cost of fuel economy.

FIG. 12 illustrates graphs 1200, 1202 and 1204 depicting elevation, gear state changes and velocity, respectively, of a vehicle 1208. Graph 1200 depicts elevation on its vertical axis, and distance along a vehicle operating route on its horizontal axis. Graph 1202 depicts transmission gear state on its vertical axis, distance along a vehicle operating route on its horizontal axis, curve 1232 which indicates the gear state of vehicle 1208 without using PGSPCCM controls, and curve 1234 which indicates the gear state of vehicle 1208 using PGSPCCM controls. Graph 1004 depicts vehicle speed on its vertical axis, distance along a vehicle operating route on its horizontal axis, and PGSPCCM control parameters including upper PCC vehicle speed threshold 1220, lower PCC vehicle speed threshold 1222, cruise reference speed 1224. Graph 1204 further depicts curve 1228 which indicates vehicle speed of vehicle 1208 without using PGSPCCM controls, curve 1226 which indicates vehicle speed of vehicle 1208 using PGSPCCM controls, and curve 1229 which indicates vehicle speed of vehicle 1208 using a lower top cruise vehicle speed threshold width 1280.

The effects of variation in PCC vehicle speed thresholds are illustrated through a comparison of the operation of vehicle 1208 at different lower PCC vehicle speed thresholds indicated by curves 1222 and 1223. The lower PCC vehicle speed threshold indicated by curve 1222 allows greater decrease in vehicle speed than the lower PCC vehicle speed threshold indicated by curve 1223. As a corollary, the lower PCC vehicle speed threshold indicated by curve 1223, results in a greater opportunity to improve vehicle speed which comes at the cost of decreased fuel economy. More generally, as illustrated by curves 1228 and 1232, when vehicle 1208 operates without using PGSPCCM controls, a gear downshift occurs at distance 1262 when the vehicle is in the midst of an uphill grade 1212 resulting in the vehicle speed profile indicated by curve 1228. As illustrated by curves 1226 and 1234, when vehicle 1208 operates using PGSPCCM controls, a gear downshift occurs at distance 1260 before the vehicle starts an uphill grade 1212 resulting in the vehicle speed profile indicated by curve 1226. As illustrated by curves 1229, when vehicle 1208 operates using a lower top cruise vehicle speed threshold width 1220, curve 1229 stays at or above lower PCC vehicle speed threshold width 1222. It can therefore be seen that a lower top cruise vehicle speed threshold width results in greater opportunity for performance.

Figure 13:
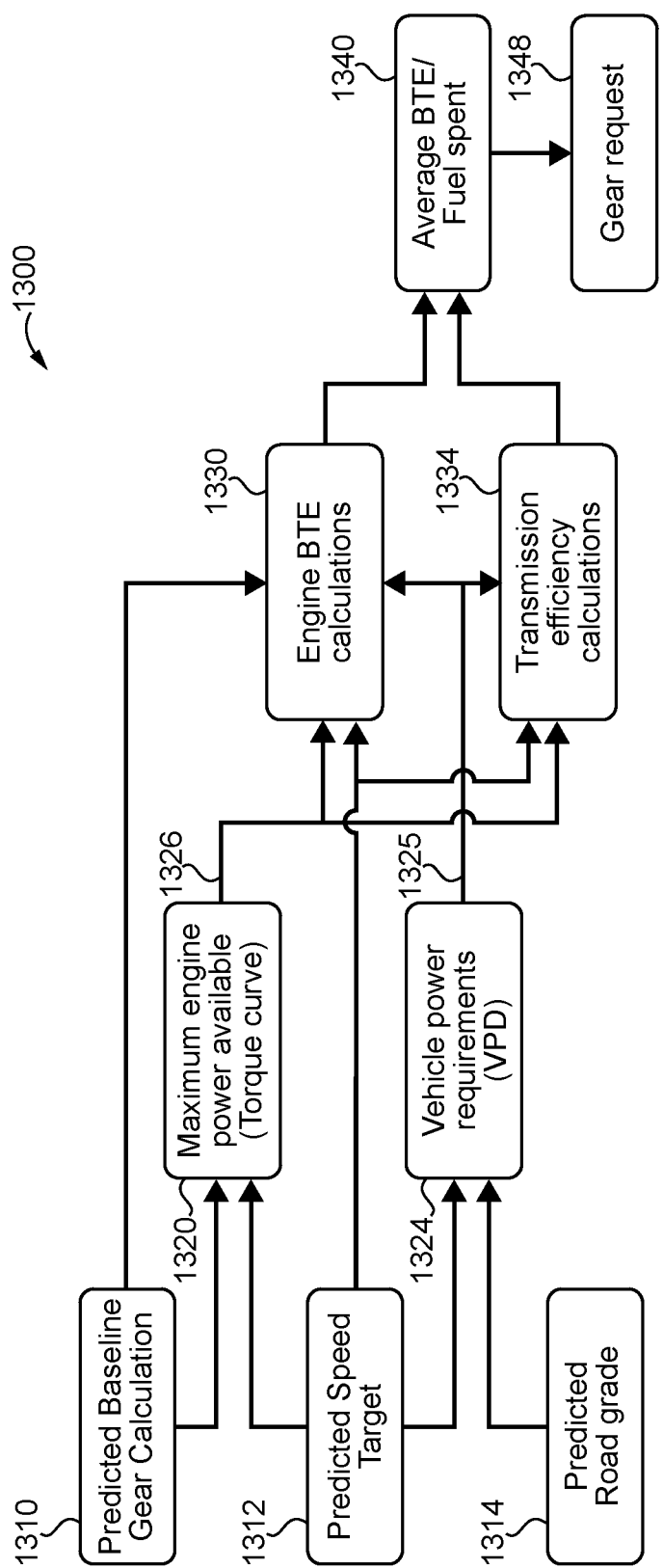
FIG. 13 is a block diagram of exemplary PGS controls aspects which may be implemented in exemplary PGSPCCM controls.

FIG. 13 illustrates a block diagram of exemplary PGS controls 1300 which may be implemented in exemplary PGSPCCM controls to provide for powertrain efficiency based modified gear shifting. In general controls 1300 perform engine BTE calculations to determine an engine BTE based on inputs of a gear number from a predicted baseline gear calculation, a predicted speed target from a predicted road grade, vehicle power requirements for the predicted target speed, and a maximum engine power available from, for example, a torque curve. Transmission efficiency calculations for a transmission efficiency are performed based on vehicle power requirements for the predicted speed target and maximum engine power available. An average BTE/fuel spent is determined from the engine BTE and transmission efficiency to determine a gear request.

In PGS controls 1300, operator 1320 receives a predicted baseline gear number 1310 which may be calculated from a default transmission shift schedule and a predicted vehicle speed target 1312 as inputs and determines and outputs a maximum engine power available 1326. The maximum engine power available 1326 may be determined based upon a predetermined torque curve, for example, using a lookup table. Operator 1324 receives the predicted vehicle speed target 1312 and a predicted road grade 1314 as inputs and determines and outputs a vehicle power requirement 1325. Vehicle power requirement 1325 may be determined in a similar manner to vehicle power requirement 525 described above in connection with FIG. 5. Operator 1330 receives the predicted baseline gear number 1310, predicted vehicle speed target 1312, the output 1326 of operator 1320 and the output 1325 of operator 1324 as inputs and determines an engine BTE. Operator 1334 receives the predicted vehicle speed target 1312, the output 1326 of operator 1320 and the output 1325 of operator 1324 as inputs and determines a transmission efficiency. Operator 1340 receives the output of operator 1330 and the output of operator 1334 and determines and average BTE or fuel spent for the baseline gear number and one or more alternate gear numbers and outputs a gear request 1348 corresponding to a gear number which results in optimized engine BTE and transmission efficiency.

Figure 14:
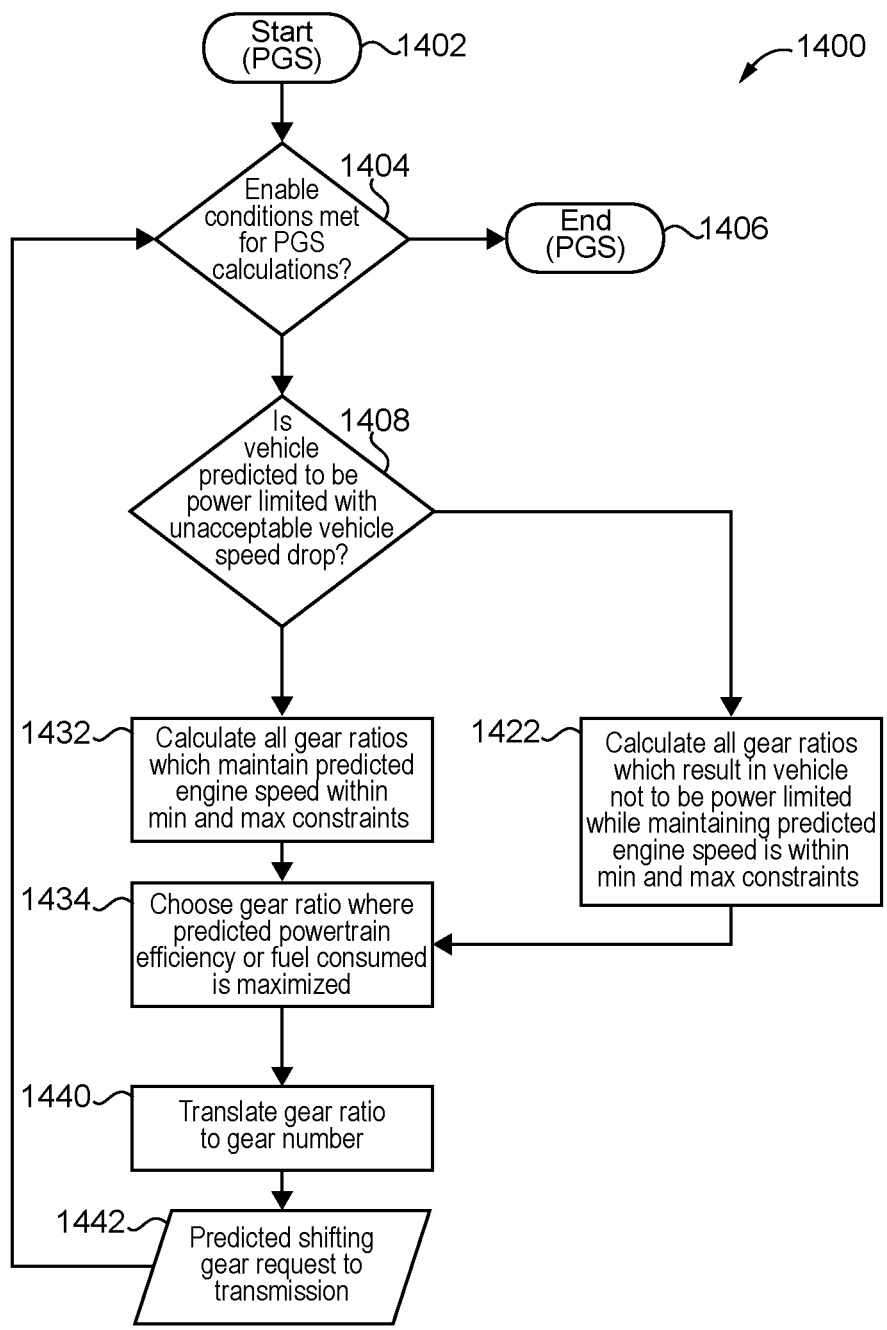
FIG. 14 a flow diagram of exemplary PGS control method aspects which may be included in exemplary PGSPCCM control methods wherein a selection of PGS control modes is based on whether a vehicle is predicted to be power limited with an unacceptable vehicle speed drop.

FIG. 14 illustrates a flow diagram of an exemplary process 1400 for arbitrating between different PGS control strategies. In one strategy, if the vehicle is predicted to be power limited with an unacceptable speed drop, all gear ratios which result in the vehicle not being power limited while maintaining predicted engine speed within minimum and maximum constraints are determined. If the vehicle is not power limited, the other PGS strategy calculates all gear ratios which maintain predicted engine speed within maximum and minimum limits. In either strategy, the gear ratio in which the predicted powertrain efficiency or fuel efficiency is maximized is selected.

Process 1400 begins at start operation 1402, and proceeds to conditional 1404 which determines if PGS enable conditions are present. If PGS enable conditions are not present process 1400 proceeds to end operation 1406. If PGS enable conditions are present process 1400 proceeds to conditional 1408 which determines if the vehicle is predicted to be power limited with an unacceptable vehicle speed drop. If the vehicle is predicted to be power limited with an unacceptable vehicle speed drop, process 1400 proceeds to operation 1422 which calculates all gear ratios which result in vehicle not to be power limited while maintaining predicted engine speed is within minimum and maximum constraints. If the vehicle is not predicted to be power limited with an unacceptable vehicle speed drop, process 1400 proceeds to operation 1432 which calculates all gear ratios which maintain predicted engine speed within minimum and maximum constraints.

From either operation 1422 or operation 1432, process 1400 proceeds to operation 1434 which chooses a gear ratio at which predicted powertrain efficiency is maximized or predicted fuel consumed is minimized. From operation 1434, process 1400 proceeds to operation 1440 which translates the determined gear ratio to gear number. From operation 1440 process 1400 proceeds to operation 1442 which sends a PGS gear request to a vehicle transmission. From operation 1442 process 1400 returns to operation 1404.

Figure 15:
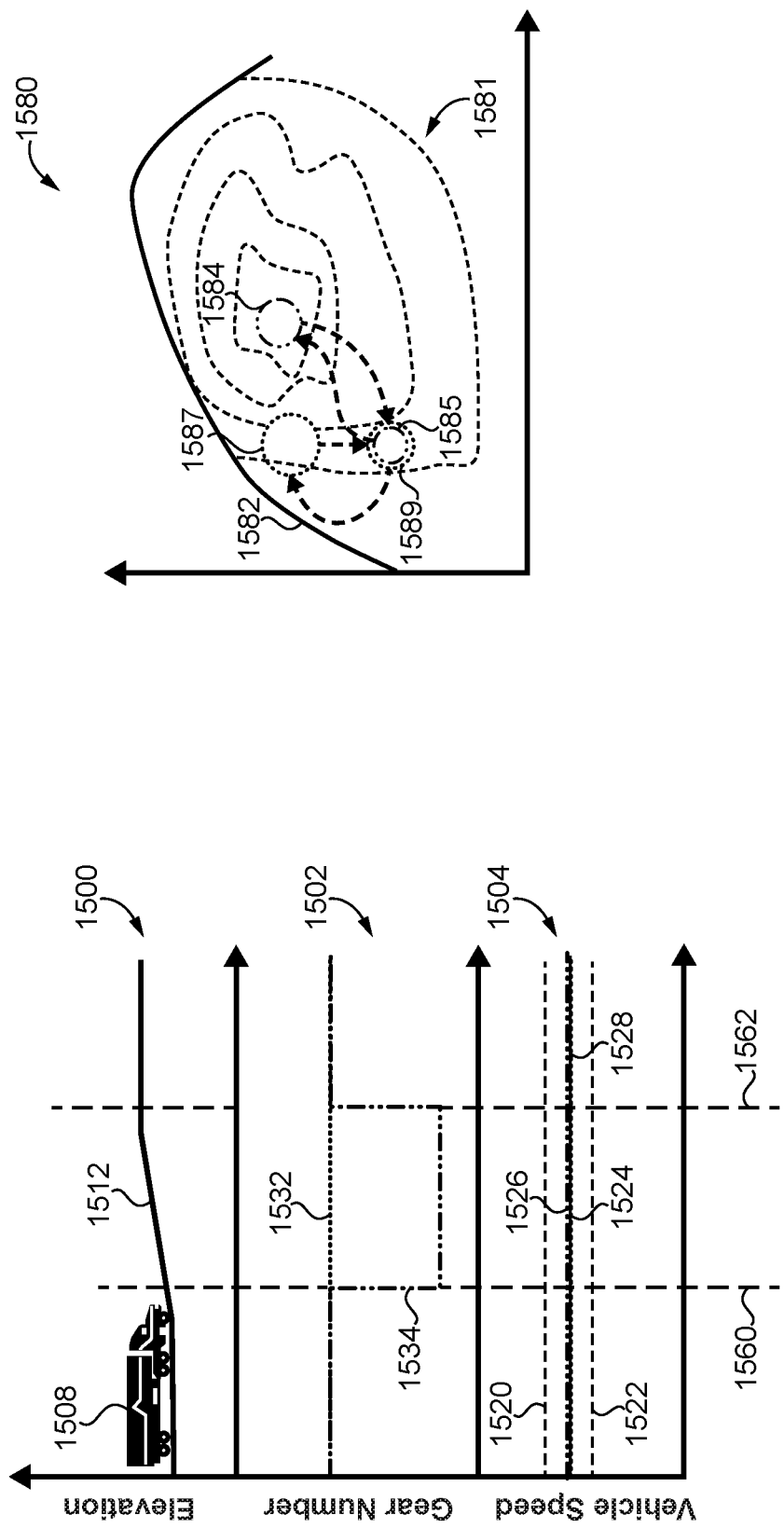
FIG. 15 depicts graphs illustrating the velocity and gear state changes, and engine efficiency changes, of a vehicle employing exemplary PGS controls aspects which may be implemented in exemplary PGSPCCM controls to provide a power train efficiency gear shift based on look ahead grade.

FIG. 15 illustrates the velocity and gear state changes of a vehicle employing certain PGS control aspects which may be implemented in PGSPCCM controls to provide a power train efficiency gear shift based on look ahead grade using system parameters including default shift schedule, powertrain efficiency, vehicle mass, and vehicle power requirements. When look ahead road grade changes do not result in an unacceptable vehicle speed, the PGS algorithm shifts to a more economical gear to provide lower fuel consumption because of powertrain efficiency improvements as compared to fuel/momentum spent on gear shifts. In addition, no reduction in vehicle speed below the upper PCC vehicle speed threshold width occurs. FIG. 15 provides one example of control operation which results in lower fuel consumption due to powertrain efficiency improvements when compared to fuel/momentum spent on gear shifts and no reduction in vehicle speed below upper PCC vehicle speed threshold width.

In general, FIG. 15 illustrates the velocity and gear state changes of a vehicle employing the PGSPCCM controls to downshift to a lower gear based on look ahead grade when transitioning from flat grade to moderate grade. Potential inputs to the PGSPCCM controls include default shift schedule, powertrain efficiency, vehicle mass, and vehicle power requirements. When look-ahead road grade change does not result in unacceptable vehicle speed, PGSPCCM controls shifts to a more economical gear.

More particularly, FIG. 15 illustrates graphs 1500, 1502 and 1504 depicting elevation, gear state changes and velocity, respectively, of a vehicle 1508. Graph 1500 depicts elevation on its vertical axis, and distance along a vehicle operating route on its horizontal axis. Graph 1502 depicts transmission gear state on its vertical axis, distance along a vehicle operating route on its horizontal axis, curve 1532 which indicates the gear state of vehicle 1508 without using PGSPCCM controls, and curve 1534 which indicates the gear state of vehicle 1508 using PGSPCCM controls. Graph 1504 depicts vehicle speed on its vertical axis, distance along a vehicle operating route on its horizontal axis, and PGSPCCM control parameters including upper PCC vehicle speed threshold 1520, lower PCC vehicle speed threshold 1522, cruise reference speed 1524. Graph 1504 further depicts curve 1528 which indicates vehicle speed of vehicle 1508 without using PGSPCCM controls, and curve 1526 which indicates vehicle speed of vehicle 1508 using PGSPCCM controls.

The effects using PGSPCCM controls are illustrated through a comparison of the operation of vehicle 1508 indicated by curves 1528 and 1532 versus the operation of vehicle 1508 indicated by curves 1526 and 1334. As illustrated by curves 1528 and 1532, when vehicle 1508 operates without using PGSPCCM controls, a gear downshift does not occur resulting in the vehicle speed profile indicated by curve 1528. As illustrated by curves 1526 and 1534, when vehicle 1508 operates using PGSPCCM controls, a gear downshift occurs at distance 1560 while vehicle 1508 begins climbing a moderate uphill grade 1512 resulting in the vehicle speed profile indicated by curve 1526. When vehicle 1508 is completing moderate uphill 1512 a gear upshifts at distance 1562 as vehicle transitions from moderate uphill 1512 to flat grade. It can therefore be seen that a shift to a more economical gear does not reduce vehicle speed below upper PCC vehicle speed threshold 1520 and powertrain efficiency improves.

FIG. 15 further illustrates a graph 1580 depicting engine power on its vertical axis, engine speed on its horizontal axis, and dashed lines showing engine BTE contours 1581. Graph 1580 depicts vehicle 1508 transitioning from flat grade to moderate uphill grade with and without PGSPCCM controls. Vehicle 1508 climbing incline 1512 without PGSPCCM experiences lower time and fuel in more fuel efficient region. Without PGSPCCM the engine operating point of vehicle 1508 starts at first position 1587 and moves to second position 1589 with less engine power and relatively constant engine speed, then back to position 1587 with increase in engine power and speed remains constant. Vehicle 1508 climbing incline 1512 with PGSPCCM experiences gear shift to optimize powertrain efficiency. With PGSPCCM the engine operating point of vehicle 1508 starts at first position 1584 and moves to second position 1585 with decrease in both engine speed and engine power, then back to first position 1584 with increase in both engine power and engine speed.

Figure 16:
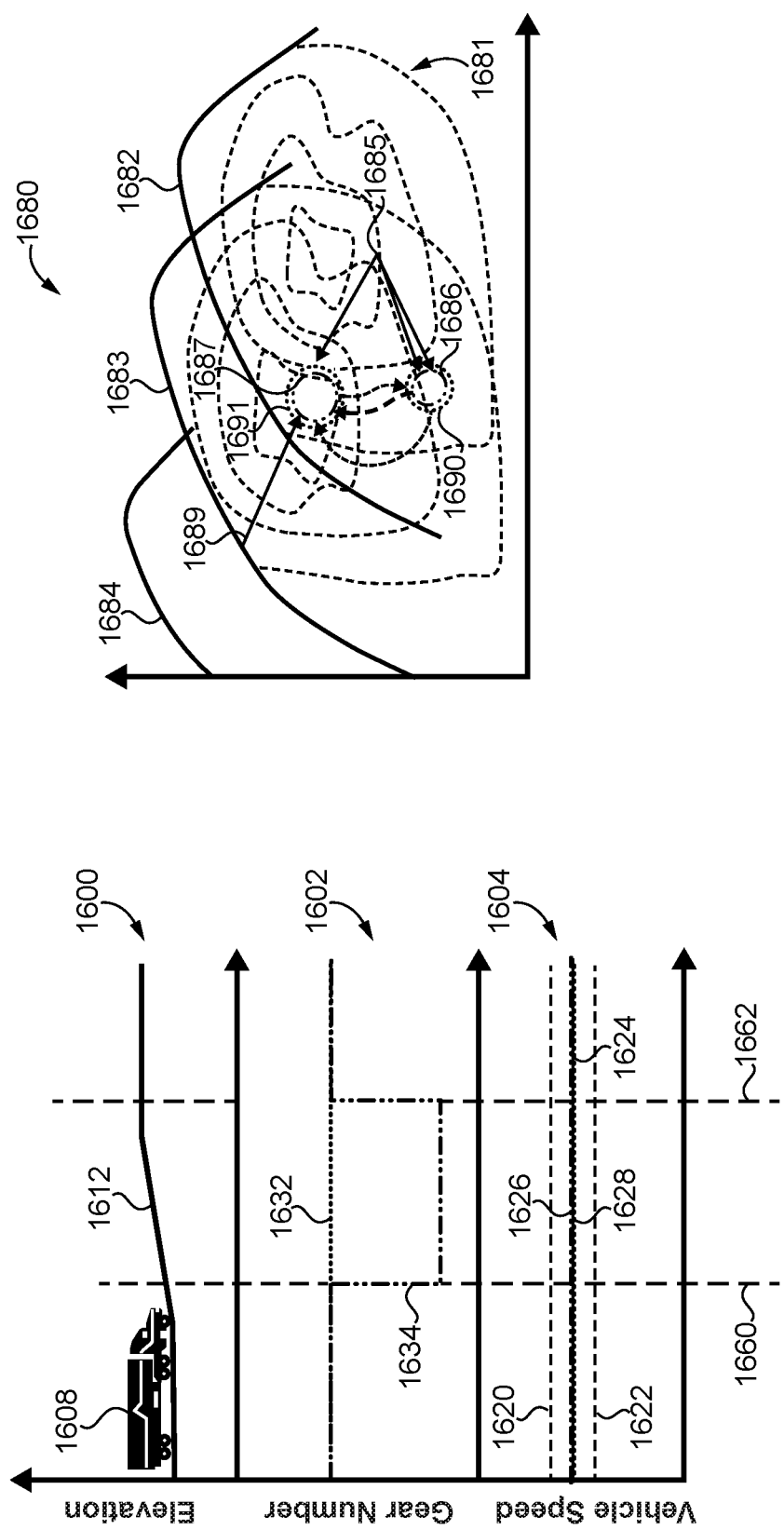
FIG. 16 depicts graphs illustrating the velocity and gear state changes, and engine efficiency changes, of a vehicle employing exemplary PGS controls aspects which may be implemented in exemplary PGSPCCM controls to provide a power train efficiency gear shift based on look ahead grade.

FIG. 16 illustrates the velocity and gear state changes of a vehicle employing certain PGS control aspects which may be implemented in PGSPCCM controls to provide a power train efficiency gear shift based on look ahead grade change that does not result in an unacceptable vehicle speed. Such shifting to a more economical gear, results in lower fuel consumption because of powertrain efficiency improvement when compared to fuel and momentum spent on gear shifts. In addition, there is no reduction in vehicle speed below the upper PCC vehicle speed threshold width. Such operation results in lower fuel consumption due to powertrain efficiency improvements when compared to fuel/momentum spent on gear shifts and no reduction in vehicle speed below upper PCC vehicle speed threshold width.

In general, FIG. 16 illustrates the velocity and gear state changes of a vehicle employing the PGSPCCM controls to downshift to a lower gear based on look ahead grade when transitioning from flat grade to moderate grade. Inputs to the PGSPCCM controls include default shift schedule, powertrain efficiency, vehicle mass, and vehicle power requirements. When look-ahead road grade change does not result in unacceptable vehicle speed, PGSPCCM controls shifts to a more economical gear.

More particularly, FIG. 16 illustrates graphs 1600, 1602 and 1604 depicting elevation, gear state changes and velocity, respectively, of a vehicle 1608. Graph 1600 depicts elevation on its vertical axis, and distance along a vehicle operating route on its horizontal axis. Graph 1602 depicts transmission gear state on its vertical axis, distance along a vehicle operating route on its horizontal axis, curve 1632 which indicates the gear state of vehicle 1608 without using PGSPCCM controls, and curve 1634 which indicates the gear state of vehicle 1608 using PGSPCCM controls. Graph 1604 depicts vehicle speed on its vertical axis, distance along a vehicle operating route on its horizontal axis, and PGSPCCM control parameters including upper PCC vehicle speed threshold 1620, lower PCC vehicle speed threshold 1622, cruise reference speed 1624. Graph 1604 further depicts curve 1628 which indicates vehicle speed of vehicle 1608 without using PGSPCCM controls, and curve 1626 which indicates vehicle speed of vehicle 1608 using PGSPCCM controls.

The effects using PGSPCCM controls are illustrated through a comparison of the operation of vehicle 1608 indicated by curves 1628 and 1632 versus the operation of vehicle 1608 indicated by curves 1626 and 1634. As illustrated by curves 1628 and 1632, when vehicle 1608 operates without using PGSPCCM controls, a gear downshift does not occur resulting in the vehicle speed profile indicated by curve 1628. As illustrated by curves 1626 and 1634, when vehicle 1608 operates using PGSPCCM controls, a gear downshift occurs at distance 1660 while vehicle 1608 begins climbing a moderate uphill grade 1612 resulting in the vehicle speed profile indicated by curve 1626. When vehicle 1608 is completing moderate uphill 1612 a gear upshift occurs at distance 1662 as vehicle transitions from moderate uphill 1612 to flat grade. It can therefore be seen that a shift to a more economical gear does not reduce vehicle speed below upper PCC vehicle speed threshold 1620 and powertrain efficiency improves.

Referring to FIG. 16 there is illustrated graph 1680 depicting engine power on its vertical axis, engine speed on its horizontal axis, and dashed lines showing engine BTE contours 1681, top gear torque curve 1682, top-gear minus one torque curve 1683 and top-gear minus two torque curve 1684. Graph 1680 depicts vehicle 1608 transitioning from flat grade to moderate uphill grade with and without PGSPCCM controls. The engine operating point of vehicle 1608 climbing incline 1612 without PGSPCCM starts at top gear torque curve 1682 position 1685 top gear torque curve operation and moves to second position 1690 with decrease in both engine speed and engine power, then to third position 1691 with increase in engine power and relatively constant engine speed, then back to second position 1690 with decrease in engine power and relatively constant engine speed. The engine operating point with vehicle 1608 climbing incline 1612 with PGSPCCM starts at top gear torque curve 1682 position 1685 top gear torque curve operation and moves to second position 1686 with decrease in both engine speed and engine power, then to third position 1687 with increase in engine power and relatively constant engine speed, then back to second position 1686 with decrease in engine power and relatively constant engine speed.

Figure 17:
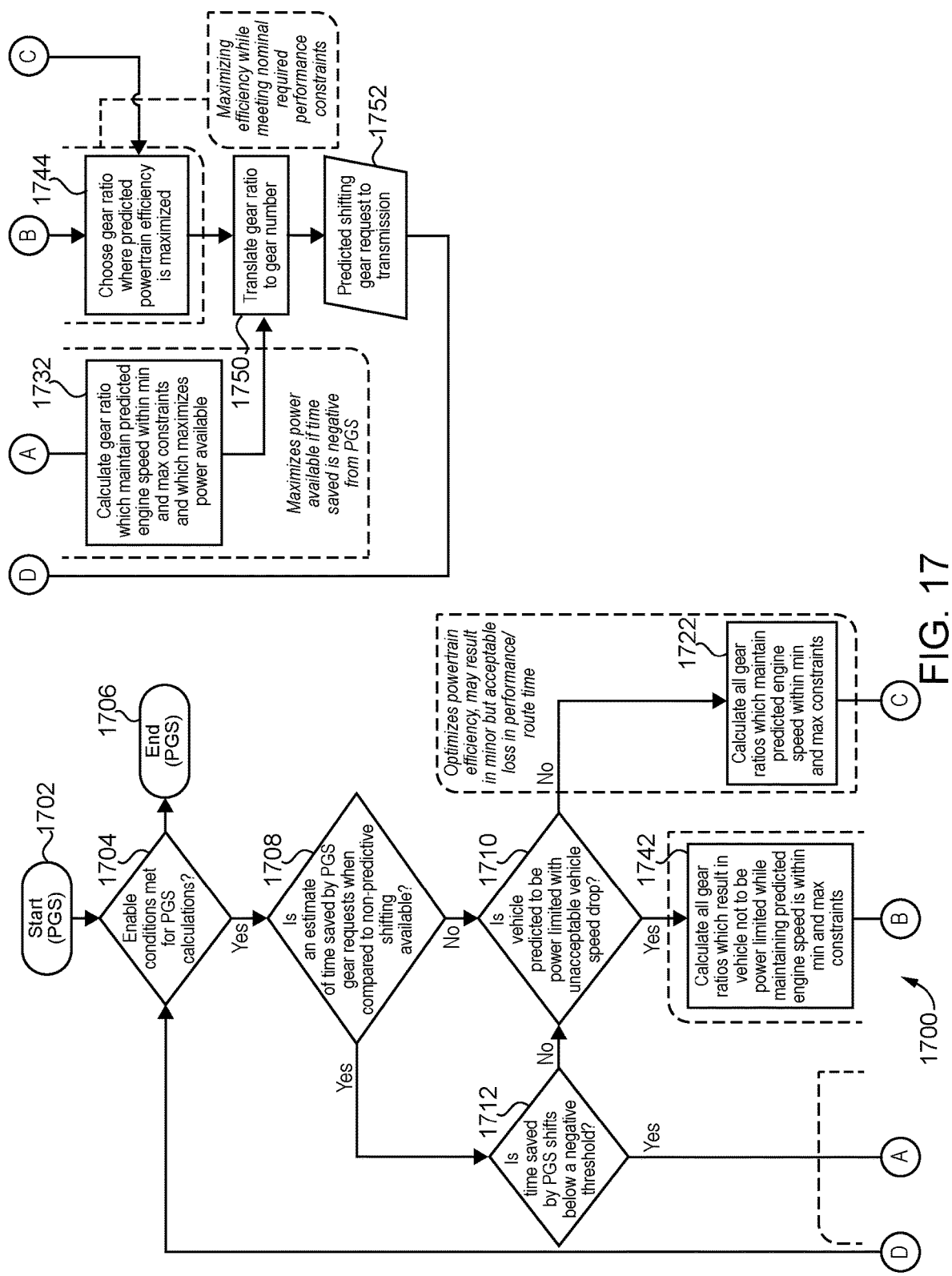
FIG. 17 shows a flow diagram of a procedure for arbitrating exemplary PGS control strategies which may be implemented in exemplary PGSPCCM controls.

FIG. 17 shows a flow diagram of an exemplary process 1700 for arbitrating between different PGS strategies. A first strategy includes maximizing the power available if time saved is available from PGS. This strategy is employed when an estimate of the time saved by PGS gear requests, when compared to non-predictive shifting, is available and the time saved is below a negative threshold. A second PGS strategy is selected to maximize efficiency while meeting nominal required performance constraints in response to no time being saved by PGS or time saved being above the negative threshold, and in response to the vehicle being predicted to be power limited with an unacceptable speed drop. A third PGS strategy is selected if the first two strategies are not available and determines all gear ratios that maintain the predicted engine speed within limits and selects the gear which optimizes powertrain efficiency but may result in minor but acceptable losses in performance and/or route time.

Process 1700 begins at start operation 1702, and proceeds to conditional 1704 which determines if PGS enable conditions are present. If PGS enable conditions are not present process 1700 proceeds to stop operation 706. If PGS enable conditions are present process 1700 proceeds to conditional 1708 which determines if an estimate of time saved by a PGS gear requests when compared to non-predictive shifting is available. If such an estimate is available, process 1700 proceeds to conditional 1712 which determine if time saved by a PGS shift request falls below a threshold, for example, a negative threshold. If time saved by a PGS shift request does not fall below a threshold, process 1700 proceeds to conditional 1710. If time saved by a PGS shift request does falls below a threshold, process 1700 proceeds to operation 1732 which calculates a gear ratio which maintains a predicted engine speed within a minimum and a maximum constraint and while concurrently maximizing an available power. From operation 1732, process 1700 proceeds to operation 1750 which translates the gear ratio calculated by operation 1732 to a transmission gear number. It shall be appreciated that operation 1732 is one example of a PGS control operation which maximizes power available if the time saved by a PGS operation is negative, i.e., the PGS operation increases travel time. From operation 1750 process 1700 proceeds to operation 1752 which sends a PGS gear request to a vehicle transmission. From operation 1752 process 1700 returns to operation 1704.

If conditional 1708 determines that an estimate of time saved by a PGS gear request when compared to non-predictive shifting is not available, process 1700 proceeds to conditional 1710 which determines if the vehicle is predicted to be power limited with unacceptable vehicle speed drop. If the vehicle is predicted to be power limited with unacceptable vehicle speed drop, process 1700 proceeds to operation 1742 which calculates all gear ratios which results in the vehicle not being power limited while concurrently maintaining predicted engine speed within minimum and maximum constraints. From operation 1742, process 1700 proceeds to operation 1744 which selects a gear ratio from those calculated by operation 1742 which maximizes predicted powertrain efficiency. From operation 1744 process 1700 proceeds to operation 1750 and from there operates and proceeds as described above. It shall be appreciated that a combination of operations 1742 and 1744 is one example of a PGS control operation which maximizes efficiency while meeting nominal required performance constraints.

If conditional 1710 determines that the vehicle is not predicted to be power limited with unacceptable vehicle speed drop, process 1700 proceeds to operation 1722 which calculates all gear ratios which maintain predicted engine speed within minimum and maximum restraints. From operation 1722, process 1700 proceeds to operation 1744 and operates and proceeds from there as described above. It shall be appreciated that operation 1722 is one example of a PGS operation which optimize powertrain efficiency while tolerating result in minor but acceptable loss in performance or travel time.

Figure 18:
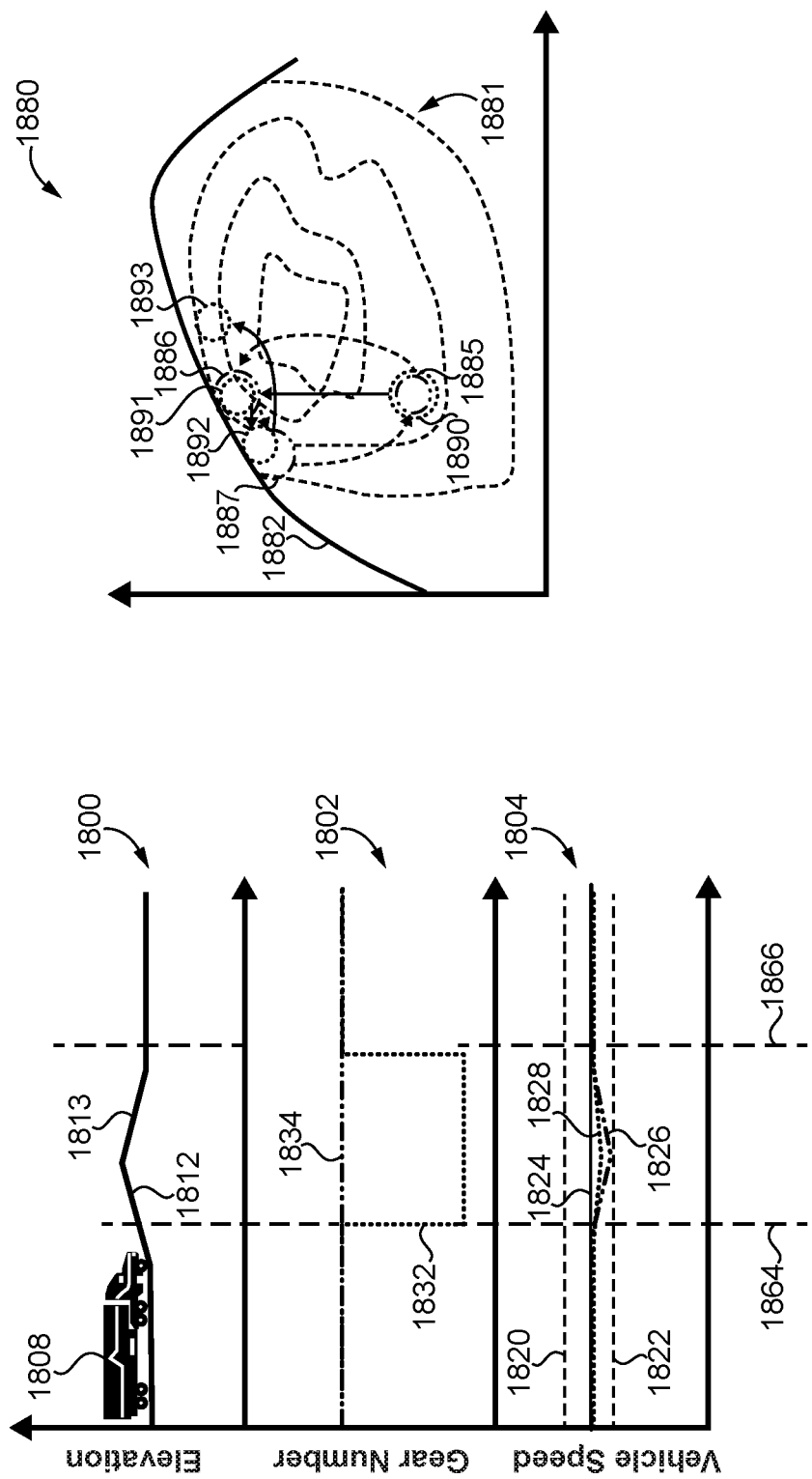
FIG. 18 depicts graphs illustrating the velocity and gear state changes, and engine efficiency changes, where gear state changes are inhibited based on look ahead data.

FIG. 18 illustrates the velocity and gear state changes that are inhibited based on look ahead data. When look ahead power demand is not changing sufficiently to result in an unacceptable predicted vehicle speed drop, the PGS controls maintains the current gear to prevent unnecessary shifting. As a result, a nominal gear shift is avoided while maintaining the vehicle speed within acceptable maximum and minimum speed vehicle speed thresholds. As a result, fuel consumption is lower due to lower cycle work and/or avoiding shift with reduction in vehicle speed below the vehicle speed threshold width.

FIG. 18 illustrates graphs 1800, 1802 and 1804 depicting elevation, gear state changes and velocity, respectively, of a vehicle 1808. Graph 1800 depicts elevation on its vertical axis, and distance along a vehicle operating route on its horizontal axis. Graph 1802 depicts transmission gear state on its vertical axis, distance along a vehicle operating route on its horizontal axis, curve 1832 which indicates the gear state of vehicle 1808 without using PGSPCCM controls, and curve 1834 which indicates the gear state of vehicle 1808 using PGSPCCM controls. Graph 1804 depicts vehicle speed on its vertical axis, distance along a vehicle operating route on its horizontal axis, and PGSPCCM control parameters including upper PCC vehicle speed threshold 1820, lower PCC vehicle speed threshold 1822, cruise reference speed 1824. Graph 1804 further depicts curve 1828 which indicates vehicle speed of vehicle 1808 without using PGSPCCM controls, and curve 1826 which indicates vehicle speed of vehicle 1808 using PGSPCCM controls.

The effects using PGSPCCM controls are illustrated through a comparison of the operation of vehicle 1808 indicated by curves 1828 and 1832 versus the operation of vehicle 1808 indicated by curves 1826 and 1834. As illustrated by curves 1828 and 1832, when vehicle 1808 operates without using PGSPCCM controls, a gear downshift occurs at distance 1864 when the vehicle is in the midst of an uphill grade segment 1812 and a downshift occurs at distance 1866 while vehicle 1808 is completing a downhill grade segment 1813 resulting in the vehicle speed profile indicated by curve 1828. As illustrated by curves 1826 and 1834, when vehicle 1808 operates using PGSPCCM controls, a gear shift does not occur while vehicle 1808 proceeds up an uphill grade segment 1812 and down a downhill grade segment 1813 resulting in the vehicle speed profile indicated by curve 1826. It can therefore be seen that maintaining current gear prevents unnecessary shifting with curve 1826 at or above lower PCC vehicle speed threshold 1822.

Referring to FIG. 18 there is illustrated graph 1880 depicting engine power on its vertical axis, engine speed on its horizontal axis, dashed lines showing engine BTE contours 1881, and top-gear 1882. Graph 1880 depicts vehicle 1808 transitioning through a driving profile depicted in graph 1800 with and without PGSPCCM controls. Vehicle 1808 without PGSPCCM experiences greater time and fuel in more fuel efficient regions. Without PGSPCCM, the engine operating point of vehicle 1808 starts at first position 1890 and moves to second position 1891 with more engine power and relatively constant engine speed, then to second position 1892 with decreases in engine speed and relatively constant engine power, then to final position 1893 with increase in engine speed and relatively constant engine power. Vehicle 1808 climbing incline 1812 with PGSPCCM experiences more time and fuel in more fuel efficient regions. With PGSPCCM the engine operating point of vehicle 1808 starts at first position 1885 and moves to second position 1886 with increase in engine power and vehicle speed relatively constant, then to second position 1887 with decrease in engine speed and relatively constant engine power, then back to first position 1885.

Figure 19:
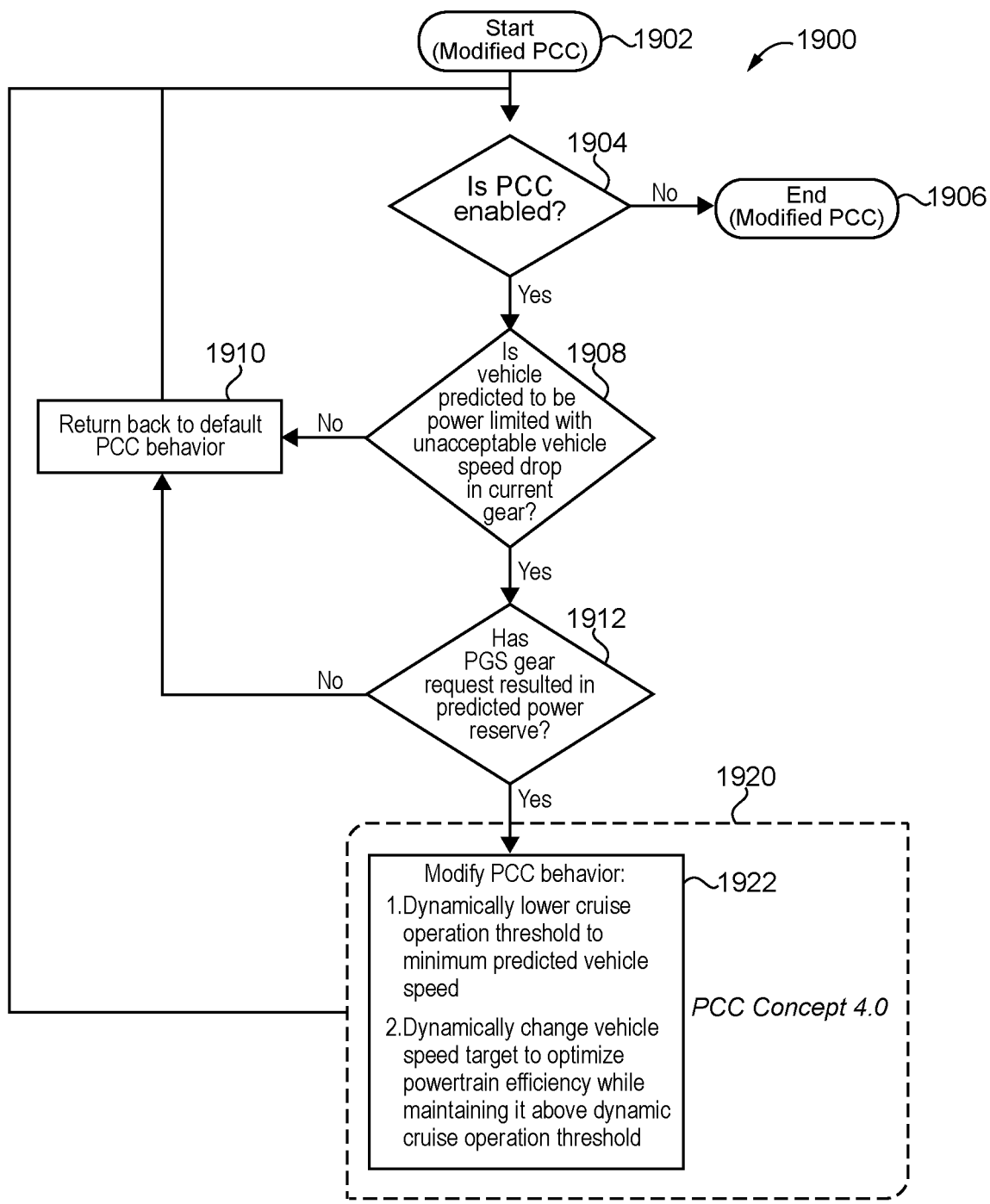
FIG. 19 shows a flow diagram of a procedure for modifying PCC behavior based on a PGS request resulting in a positive predicted power reserve.
Figure 20:
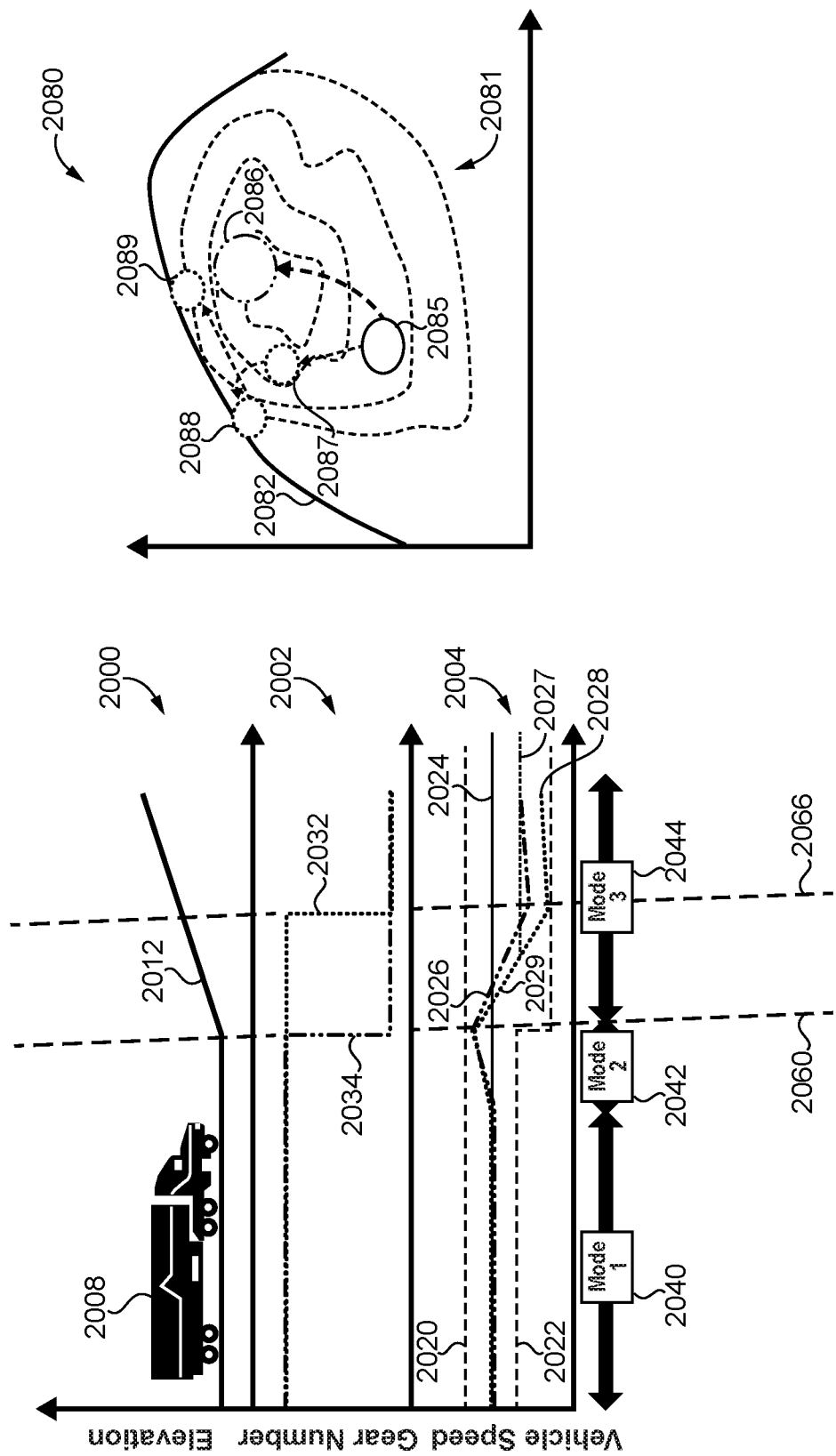
FIG. 20 depicts graphs illustrating the velocity and gear state changes, and engine efficiency changes, of a vehicle employing PGSPCCM controls to lower a speed target and vehicle speed threshold transitioning to an uphill segment.
Figure 21:
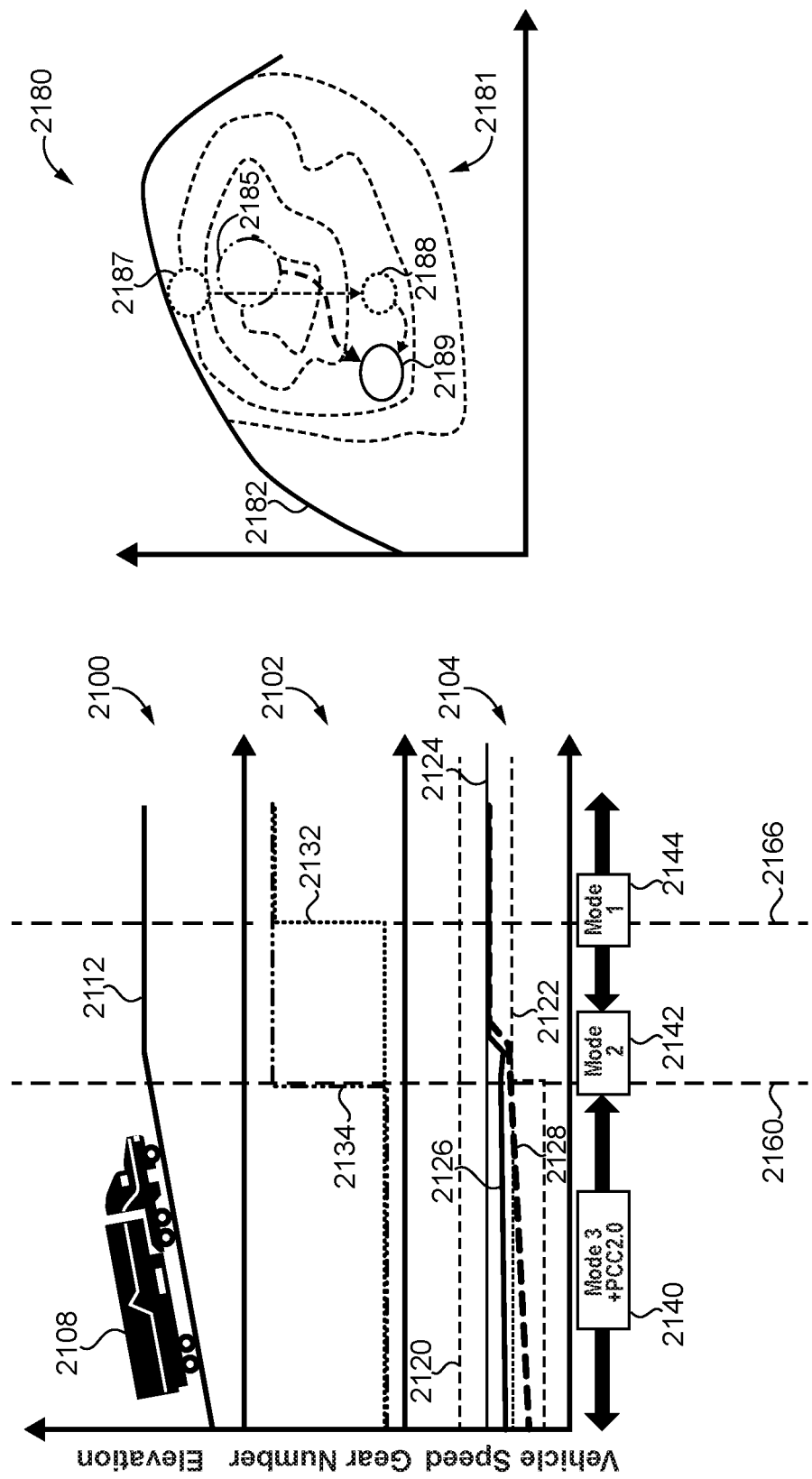
FIG. 21 depicts graphs illustrating the velocity and gear state changes, and engine efficiency changes, of a vehicle employing PGSPCCM controls to return to a default speed target and vehicle speed threshold transitioning from an uphill segment.

FIG. 19 shows a flow diagram according to an exemplary process 1900 which operates PGSPCCM controls for modifying PCC behavior based on a PGS request resulting in a power reserve. If PCC is enabled, it is determined if the vehicle is power limited with an unacceptable vehicle speed drop in current gear. If not unacceptable, then nominal PCC control is resumed or continued. If the predicted vehicle speed drop is unacceptable, it is determined if the PGS gear request results in a predicted positive power reserve. If not, PCC control is resumed or continued. If so, the PCC is modified from its nominal/default control to dynamically lower the cruise operation threshold to a minimum predicted vehicle speed and dynamically change the vehicle speed target to optimize powertrain efficiency while maintaining it above a dynamic cruise operation threshold. FIGS. 20 and 21 show examples of this PGSPCCM procedure in implementation.

Process 1900 begins at start operation 1902, and proceeds to conditional 1904 which determines if PCC enabled. If PCC enable not present process 1900 proceeds to stop operation 1906. If PCC is enabled process 1900 proceeds to conditional 1908 which determines if the vehicle predicted to be power limited with unacceptable vehicle speed drop in current gear. If the vehicle is predicted to be power limited with unacceptable vehicle speed drop in current gear, process 1900 proceeds to operator 1910 which returns operation to back to default PCC behavior. If the vehicle is not predicted to be power limited with unacceptable vehicle speed drop in current gear, process 1900 proceeds to conditional 1912 which determines if a PGS gear request has resulted in predicted positive power reserve. If no positive power reserve is predicted process 1900 proceeds to operator 1910. If a positive power reserve is predicted process 1900 proceeds to operator 1922 which modifies PCC behavior by first dynamically lowering cruise operation threshold to minimum predicted vehicle speed, and second dynamically change vehicle speed target to optimize powertrain efficiency while maintaining it above dynamic cruise operation threshold. From operation 1922, process 1900 proceeds to conditional 1904.

FIG. 20 illustrates the velocity and gear state changes of a vehicle employing PGSPCCM controls to lower a speed target and vehicle speed threshold when transitioning to an uphill segment. The system parameters include the default shift schedule, powertrain efficiency, vehicle mass, vehicle power requirements, PCC mode definition and calculations, and upper PCC vehicle speed threshold width settings. When the PCC nominal/default mode is to slow down on an uphill segment and the PGS part of the controls has requested a downshift, the PGSPCCM controls lowers the upper PCC vehicle speed threshold width to a minimum predicted vehicle speed along the segment to ensure that PCC fueling controls. The speed target is modified to improve powertrain efficiency and vehicle losses in the down selected gear. The vehicle speed threshold is also modified to accommodate lower vehicle speed. As a result, fuel consumption is lower from powertrain efficiency improvement with no reduction in vehicle speed below the modified lower PCC vehicle speed threshold 2022. Such operation results in lower fuel consumption due to powertrain efficiency improvements and no reduction in vehicle speed below modified lower PCC vehicle speed threshold.

FIG. 20 illustrates graphs 2000, 2002 and 2004 depicting elevation, gear state changes and velocity, respectively, of a vehicle 2008. Graph 2000 depicts elevation on its vertical axis, and distance along a vehicle operating route on its horizontal axis. Graph 2002 depicts transmission gear state on its vertical axis, distance along a vehicle operating route on its horizontal axis, curve 2032 which indicates the gear state of vehicle 2008 without using PGSPCCM controls, and curve 2034 which indicates the gear state of vehicle 2008 using PGSPCCM controls. Graph 2004 depicts vehicle speed on its vertical axis, distance along a vehicle operating route on its horizontal axis, and PGSPCCM control parameters including upper PCC vehicle speed threshold 2020, lower PCC vehicle speed threshold 2022, cruise reference speed 2024. Graph 2004 further depicts curve 2028 which indicates vehicle speed of vehicle 2008 without using PGSPCCM controls, curve 2026 which indicates vehicle speed of vehicle 2008 using PGSPCCM controls, curve 2027 default PCC controls target, and curve 2028 PCC controls with PGSPCCM. Below Graph 2004 further depicts block 2040 mode-1 which returns to isochronous speed target, block 2042 mode-2 which is pre-uphill speed up, and block 2044 mode-3 which is uphill slowdown.

The effects using PGSPCCM controls are illustrated through a comparison of the operation of vehicle 2008 indicated by curves 2028, 2029 and 2032 versus the operation of vehicle 2008 indicated by curves 2026 and 2034. As illustrated by curves 2028 and 2032, when vehicle 2008 operates without using PGSPCCM controls, a gear downshift occurs at distance 2066 resulting in the vehicle speed profile indicated by curve 2028 and 2029. At distance 2060, lower PCC vehicle speed threshold 2022 is modified by reducing its value. The modified value of lower PCC vehicle speed threshold 2022, allows vehicle speed to vary as indicated by curve 2026 without terminating PCC operation which could occur if curve 2026 fell below the unmodified value of curve 2022.

Referring to FIG. 20 there is illustrated graph 2080 depicting engine power on its vertical axis, engine speed on its horizontal axis, and dashed lines showing engine BTE contours 2081, and top gear torque curve 2082. Graph 2080 depicts vehicle 2008 transitioning from flat grade to uphill grade with and without PGSPCCM controls. The engine operating point of vehicle 2008 climbing incline 2012 without PGSPCCM starts position 2085 and moves to second position 2087 with decrease in engine power and relative constant engine speed, then to third position 2088 with increase in engine power and decrease in engine speed, then back to fourth position 2089 with increase in both engine power and engine speed. The engine operating point of vehicle 2008 climbing incline 2012 with PGSPCCM starts at position 2085 and moves to position 2086 with increase in both engine speed and engine power.

FIG. 21 illustrates the velocity and gear state changes of a vehicle employing a PGSPCCM algorithm to return to a default speed target and vehicle speed threshold when transitioning from an uphill segment. The PCC default mode is slow down on the uphill segment and the PGS part of the controls requests an upshift, the PGSPCCM controls increases the lower PCC vehicle speed threshold to a default value and provides an early upshift as compared to the default shift schedule. After the PGSPCCM controls transitions back to the default PCC mode and vehicle speed threshold references. As a result, greater fuel efficiency is provided at the same trip time since lower fuel consumption results from the powertrain efficiency improvement. Alternatively, a lower trip time at the same fuel efficiency can be provided due to a lower trip time from increased cycle work. Also, improved speed tracking when the vehicle is power limited is provided.

FIG. 21 illustrates graphs 2100, 2102 and 2104 depicting elevation, gear state changes and velocity, respectively, of a vehicle 2108. Graph 2100 depicts elevation on its vertical axis, and distance along a vehicle operating route on its horizontal axis. Graph 2102 depicts transmission gear state on its vertical axis, distance along a vehicle operating route on its horizontal axis, curve 2132 which indicates the gear state of vehicle 2108 without using PGSPCCM controls, and curve 2134 which indicates the gear state of vehicle 2108 using PGSPCCM controls. Graph 2104 depicts vehicle speed on its vertical axis, distance along a vehicle operating route on its horizontal axis, and PGSPCCM control parameters including upper PCC vehicle speed threshold 2120, lower PCC vehicle speed threshold 2122, cruise reference speed 2124. Graph 2104 further depicts curve 2128 which indicates vehicle speed of vehicle 2108 without using PGSPCCM controls, curve 2126 which indicates vehicle speed of vehicle 2108 using PGSPCCM controls, curve 2127 default PCC controls target, and curve 2128 PCC controls with PGSPCCM. Below Graph 2104 further depicts block 2140 mode-3 which returns to isochronous speed target, block 2142 mode-2 which is pre-uphill speed up, and block 2144 mode-1 which is uphill slowdown.

The effects using PGSPCCM controls are illustrated through a comparison of the operation of vehicle 2108 indicated by curves 2128 and 2132 versus the operation of vehicle 2108 indicated by curves 2126 and 2134. As illustrated by curves 2128 and 2132, when vehicle 2108 operates without using PGSPCCM controls, a gear upshift occurs at distance 2166 resulting in the vehicle speed profile indicated by curve 2128. As illustrated by curves 2126 and 2134, when vehicle 2108 operates using PGSPCCM controls, a gear upshift occurs at distance 2160 before vehicle 2108 begins climbing a relatively steep or severe uphill grade 2112 resulting in the vehicle speed profile indicated by curve 2126.

Referring to FIG. 21 there is illustrated graph 2180 depicting engine power on its vertical axis, engine speed on its horizontal axis, and dashed lines showing engine BTE contours 2181, and top gear torque curve 2182. Graph 2180 depicts vehicle 2108 transitioning from uphill grade to flat grade with and without PGSPCCM controls. Without PGSPCCM the engine operating points of vehicle 2108 climbing incline 2112 without PGSPCCM experiences lugback, lower BTE and lower cycle work. Without PGSPCCM the engine operating points of vehicle 2108 starts at position 2187 and moves to second position 2188 with decrease in engine power and relative constant engine speed, then to third position 2189 with relatively constant engine power and decrease in engine speed. Vehicle 2108 climbing incline 2112 with PGSPCCM experiences carry-over momentum and upshift earlier. With PGSPCCM the engine operating points of vehicle 2108 starts at position 2185 and moves to position 2189 with decrease in both engine speed and engine power.

Figure 22:
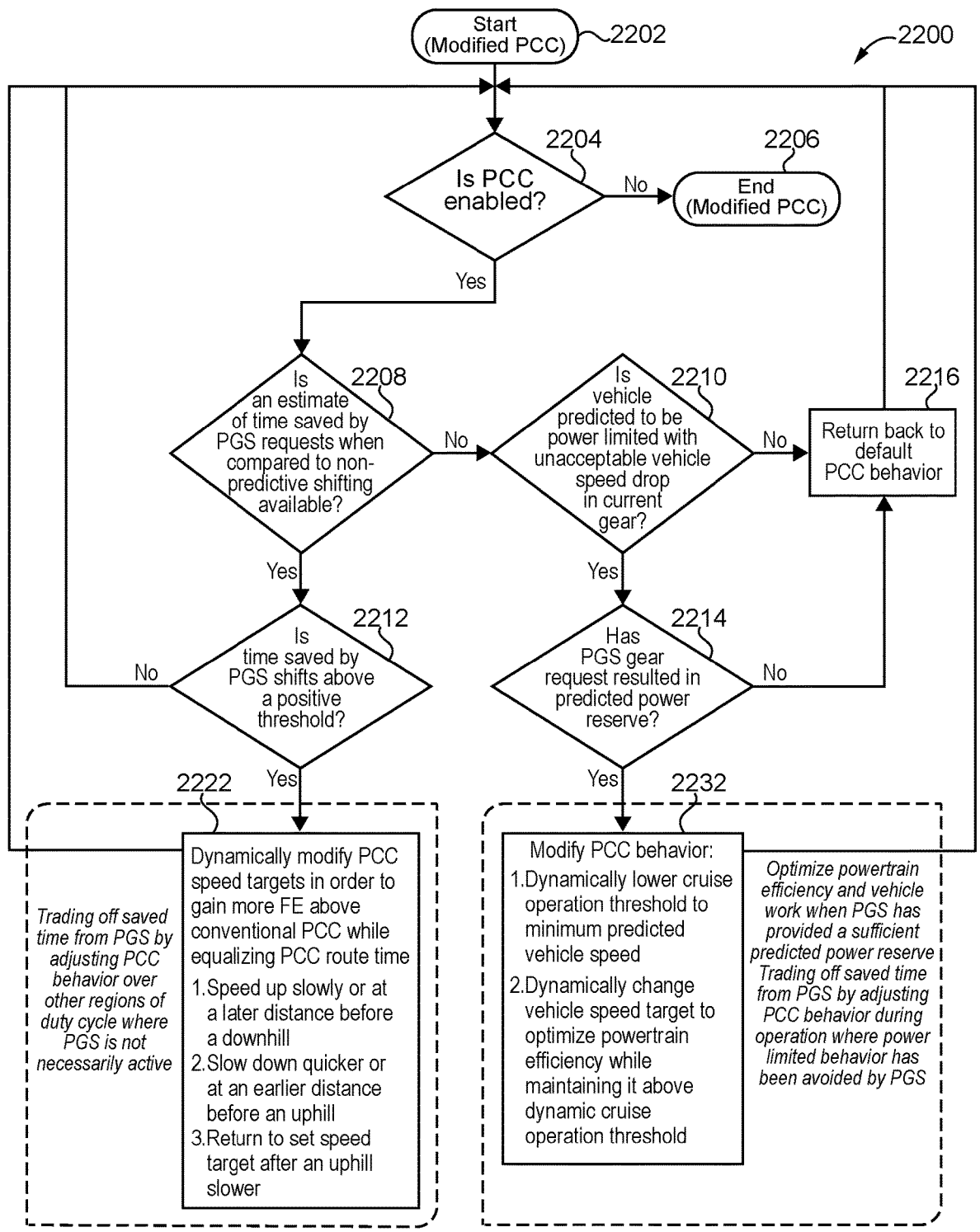
FIG. 22 shows a flow diagram of a procedure for arbitrating between time saved and power reserve in modifying nominal/default PCC behavior based on a PGS request.

FIG. 22 illustrates a flow diagram according to an exemplary process 2200 for arbitrating among different modified PCC control behaviors based on timed saved and availability of a positive power reserve. If the time saved by the PGS request is known and above a positive threshold, then PCC speed is dynamically modified to gain more fuel efficiency above nominal/default PCC control while equalizing PCC route time. The PCC route time can be equalized by speeding up slowly or speeding up at a later distance before a downhill segment, slowing down quicker or at an earlier distance before an uphill segment, and/or returning to a set speed target after an uphill segment slower speed. This strategy trades off time saved during PGS control by adjusting PCC behavior over other regions of the duty cycle where PGS control is not active.

Process 2200 begins at start operation 2202 and proceeds to conditional 2204 which determines if PCC is enabled. If PCC is not enabled, process 2200 process to stop operation 2206. If PCC is enable, process 2200 proceeds to conditional 2208 which determine if an estimate of time saved by PGS gear requests when compared to non-predictive shifting available. If an estimate of time saved is available, process 2200 proceeds to conditional 2212 which determine if time saved by a PGS event is above a threshold, for example, a positive threshold. If time saved by a PGS event is not above the threshold, process 2200 proceeds to conditional 2204.

If time saved by a PGS event is above the threshold, process 2200 proceeds to operation 2222 which dynamically modifies PCC speed targets in order to gain more fuel economy above conventional PCC while equalizing PCC route time. In the illustrated form operation 2222 performs one or more of an operation to delay initiation of a pre-uphill acceleration of the vehicle system, an operation to reduce a rate of pre-uphill acceleration of the vehicle system, an operation to advance initiation of a pre-downhill deceleration of the vehicle system, an operation to increase a rate of pre-downhill acceleration of the vehicle system, an operation to delay initiation of a post-uphill acceleration of the vehicle system, and an operation to reduce a rate of post-uphill acceleration of the vehicle system. It shall be appreciated that operation 2222 is one example of a PGSPCCM control operation that trades or spends saved time resulting from a PGS operation by adjusting PCC behavior over to reduce vehicle speed regions of the duty cycle including, for example, regions where PGS is not necessarily active.

If conditional 2208 determines that an estimate of time saved by PGS gear requests when compared to non-predictive shifting is not available, process 2200 proceeds to conditional 2210 which determines if the vehicle predicted to be power limited with unacceptable vehicle speed drop in current gear. If the vehicle is not predicted to be power limited, process 2200 proceeds to operation 2216 which restores default PCC behavior, and from operation 2216 process 2200 proceeds to conditional 2204.

If the vehicle is predicted to be power limited conditional 2210 proceeds to conditional 2214 which determine if a received PGS gear request resulted in predicted positive power reserve. If a received PGS gear request did not result in predicted positive power reserve process 2200 proceeds to operation 2216 which restores default PCC behavior, and from operation 2216 proceeds to conditional 2204. If a received PGS gear request did result in predicted positive power reserve process 2200 proceeds to operation 2232 which modifies PCC behavior. In the illustrated form operation 2232 dynamically lowers the lower PCC vehicle speed threshold to the minimum predicted vehicle speed over a route segment and dynamically changes a vehicle speed target to optimize powertrain efficiency while maintaining it above dynamic cruise operation threshold. It shall be appreciated that operation 2232 is one example of a PGSPCCM control operation that optimizes powertrain efficiency and vehicle work when PGS has provided a sufficient predicted positive power reserve by trading off time saved from PGS by adjusting PCC behavior during operation where power limited behavior has not been avoided by PGS control. From operation 2232 process 2200 proceeds to conditional 2204.

Figure 23:
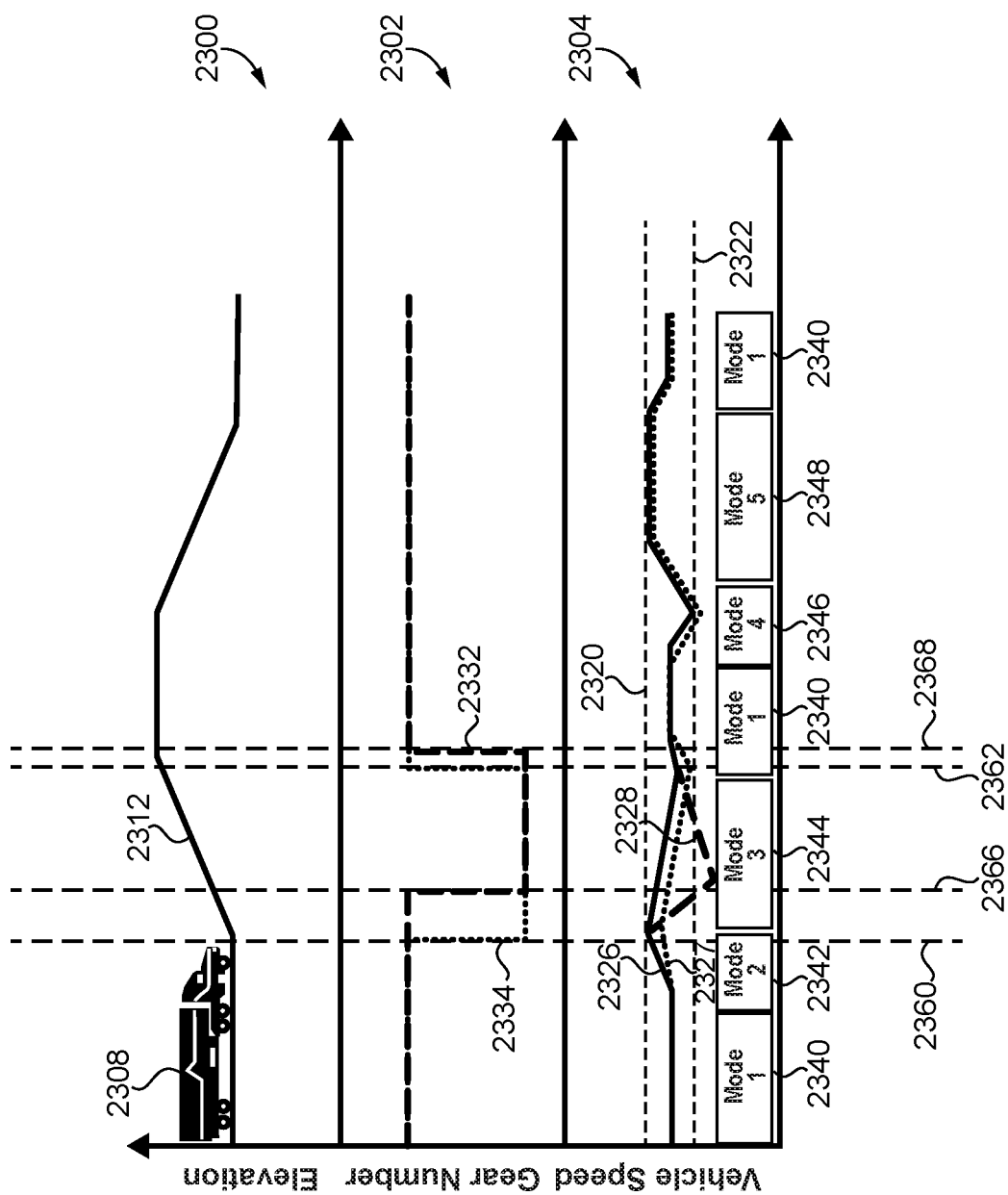
FIG. 23 depicts graphs illustrating the velocity and gear state changes of a vehicle employing PGSPCCM controls to utilize time saved by PGS by modifying nominal PCC control.

FIG. 23 illustrates the velocity and gear state changes of a vehicle employing a PGSPCCM controls to utilize time saved by the downshift by modifying PCC control. When the PGS controls has requested a downshift, the PCC controls calculates the time saved during the requested downshifts. The PCC mode references are dynamically adjusted to speed up pre-uphill, to slow down pre-downhill, to slow down uphill, and to speed up downhill, and return to isochronous cruise target speed to trade off the time saved for greater fuel efficiency.

FIG. 23 illustrates graphs 2300, 2302 and 2304 depicting elevation, gear state changes and velocity, respectively, of a vehicle 2308. Graph 2300 depicts elevation on its vertical axis, and distance along a vehicle operating route on its horizontal axis. Graph 2302 depicts transmission gear state on its vertical axis, distance along a vehicle operating route on its horizontal axis, curve 2332 which indicates the gear state of vehicle 2308 without using PGSPCCM controls, and curve 2334 which indicates the gear state of vehicle 2308 using PGSPCCM controls. Graph 2304 depicts vehicle speed on its vertical axis, distance along a vehicle operating route on its horizontal axis, and PGSPCCM control parameters including upper PCC vehicle speed threshold 2320 and lower PCC vehicle speed threshold 2322, and may also include a cruise reference speed. Graph 2304 further depicts curve 2328 which indicates vehicle speed of vehicle 2308 without using PGSPCCM controls, curve 2326 which indicates vehicle speed of vehicle 2308 using PGSPCCM controls with a modified PCC speed target, and curve 2327 speed of vehicle 2308 using PGSPCCM controls with a default PCC speed target. Below Graph 2304 further depicts block 2340 mode-1 which returns to isochronous speed target, block 2342 mode-2 which is pre-uphill speed up, block 2344 mode-3 which is uphill slowdown, block 2346 which is pre-downhill speed up, and block 2348 which is downhill speed up.

The effects using PGSPCCM controls are illustrated through a comparison of the operation of vehicle 2308 indicated by curves 2328 and 2332 versus the operation of vehicle 2308 indicated by curve 2326 or 2327 and curve 2334. As illustrated by curves 2328 and 2332, when vehicle 2308 operates without using PGSPCCM controls, a gear downshift occurs at distance 2366 and a gear up shift occurs at distance 2368 resulting in the vehicle speed profile indicated by curve 2328. As illustrated by curves 2326 and 2334, when vehicle 2308 operates using PGSPCCM controls and a default PCC speed target, a gear downshift shift occurs at distance 2360 before vehicle 2308 begins climbing a relatively steep or severe uphill grade 2312 and a gear upshift occurs at distance 2362 resulting in the vehicle speed profile indicated by curve 2326. As illustrated by curves 2327 and 2334, when vehicle 2308 operates using PGSPCCM controls and a modified PCC speed target, a gear downshift shift occurs at distance 2360 before vehicle 2308 begins climbing a relatively steep or severe uphill grade 2312, a gear upshift occurs at distance 2362 resulting in an increased vehicle speed profile indicated by curve 2327.

A number of exemplary further exemplary embodiments shall now be further described. A first exemplary embodiment is a method comprising: determining a projected engine power requirement for an engine of a vehicle based on look ahead route information for at least part of a route to be traveled by the vehicle, the projected engine power requirement including an engine power required to maintain a vehicle speed within predetermined route parameters utilizing a default shift schedule; determining a projected change of the vehicle speed based on the projected engine power requirement; generating a gear request based on the projected engine power requirement and the projected change of vehicle speed that differs from a nominal gear request based on the default shift schedule, wherein the gear request defines a gear state of a transmission connected to the engine; dynamically adjusting a nominal predictive cruise control target speed in response to the gear request such that at least one of the vehicle's speed, trip time and fuel economy are improved over the vehicle speed resulting without the gear request; and operating the vehicle in response to the gear request and adjusted nominal predictive cruise control target speed.

A second exemplary embodiment is a method comprising: determining a projected engine power requirement for an engine of a vehicle based on look ahead route information for at least part of a route to be traveled by the vehicle, the projected engine power requirement including an engine power required to maintain a vehicle speed within predetermined route parameters utilizing a default shift schedule; determining a projected change of the vehicle speed based on the projected engine power requirement; generating a gear request based on the projected engine power requirement and the projected change of vehicle speed that differs from a nominal gear request based on the default shift schedule, wherein the gear request defines a gear state of a transmission connected to the engine; determining a time saved with the gear request to the default shift schedule; dynamically adjusting a nominal predictive cruise control target speed in response to the time saved such that at least one of the vehicle's speed, trip time and fuel economy are improved over the vehicle speed resulting without the gear request; and operating the vehicle in response to the gear request and adjusted nominal predictive cruise control target speed.

In certain forms of the first or second exemplary embodiments the route information includes a current route condition and a forward route condition for at least a portion of the route defined by a data window, wherein the current route condition includes route information at the vehicle's current location and the forward route condition includes route information through the data window. In certain forms the route information includes at least one of a grade of the route, traffic conditions, location and type of traffic control signs and signals, and posted and effective speed limits. In certain forms the projected engine power requirement is further based on a default shift schedule, a vehicle mass, a powertrain efficiency, a vehicle power requirement, predictive cruise control mode definition and settings, and upper PCC vehicle speed threshold width settings.

A third embodiment is an apparatus including a controller configured to perform the methods according to the first exemplary embodiment, the second exemplary embodiment or the forms thereof.

A fourth exemplary embodiment is a system comprising: an engine for a vehicle; a transmission mechanically coupled to the engine; a source of route information, the route information including current and forward route conditions of at least a portion of a route of the vehicle traveling at or near a vehicle speed; a controller configured to determine a projected engine power requirement for the engine based on look ahead route information for at least part of a route to be traveled by the vehicle, the projected engine power requirement including an engine power required to maintain a vehicle speed within predetermined route parameters utilizing a default shift schedule, the controller further being configured to determine a projected change of the vehicle speed based on the projected engine power requirement and generate a gear request based on the projected engine power requirement and the projected change of vehicle speed that differs from a nominal gear request based on the default shift schedule, wherein the gear request defines a gear state of the transmission, the controller further being configured to dynamically adjusting a nominal predictive cruise control target speed in response to the gear request such that at least one of the vehicle's speed, trip time and fuel economy are improved over the vehicle speed resulting without the gear request.

In certain forms of the fourth exemplary embodiment the transmission includes a transmission controller structured to interrogate the gear state communicated by the controller and to implement the gear state if appropriate. In certain forms the engine includes an engine controller structured to interrogate the adjusted nominal predictive cruise control target speed communicated by the controller and to implement the interim vehicle reference speed via control of at least one of fuel and air to the engine.

A fifth exemplary embodiment is a system comprising: an engine for a vehicle; a transmission mechanically coupled to the engine; a source of route information, the route information including current and forward route conditions of at least a portion of a route of the vehicle traveling at or near a vehicle speed; a controller configured to determine a projected engine power requirement for the engine based on look ahead route information for at least part of a route to be traveled by the vehicle, the projected engine power requirement including an engine power required to maintain a vehicle speed within predetermined route parameters utilizing a default shift schedule, the controller also being configured to determine a projected change of the vehicle speed based on the projected engine power requirement and generate a gear request based on the projected engine power requirement and the projected change of vehicle speed that differs from a nominal gear request based on the default shift schedule, wherein the gear request defines a gear state of the transmission, the controller also being configured to determine a time saved with the gear request to the default shift schedule and dynamically adjust a nominal predictive cruise control target speed in response to the time saved such that at least one of the vehicle's speed, trip time and fuel economy are improved over the vehicle speed resulting without the gear request.

In certain forms of the fifth exemplary embodiment, the transmission includes a transmission controller structured to interrogate the gear state communicated by the controller and to implement the gear state if appropriate; and the engine includes an engine controller structured to interrogate the adjusted nominal predictive cruise control target speed communicated by the controller and to implement the interim vehicle reference speed via control of at least one of fuel and air to the engine.

A sixth exemplary embodiment is a vehicle system comprising: an engine configured to output torque; a transmission structured to receive torque from the engine and to output torque to propel the vehicle system; an electronic control system operatively coupled with the engine and the transmission, the electronic control system being structured to: determine a modified gear request in response to look ahead route information for at least part of a route to be traveled by the vehicle system, the modified gear request defining a gear state of the transmission different from a default shift schedule gear state, determine a modified predictive cruise control (PCC) setting in response to the modified gear request, the modified PCC setting comprising one or both of a modified PCC vehicle speed target and a modified PCC vehicle speed threshold defining a limit on PCC operation, and control the engine and the transmission in response to the modified predictive cruise control setting and the modified gear request.

In certain forms of the sixth exemplary embodiment the modified PCC setting comprises the modified PCC vehicle speed target and the modified PCC vehicle speed threshold, and the modified PCC vehicle speed target and the modified PCC vehicle speed threshold provide modified operation of the engine with increased efficiency relative to an unmodified operation of the engine in response to a preexisting PCC vehicle speed target and a preexisting PCC vehicle speed threshold.

In certain forms of the sixth exemplary embodiment the modified gear request is a downshift of the transmission in response to the look ahead route information indicating an increased road grade, the modified PCC setting comprises the modified PCC vehicle speed target and the modified PCC vehicle speed threshold, the modified PCC vehicle speed threshold is reduced relative to a preexisting PCC vehicle speed threshold, the modified PCC vehicle speed target is less than the preexisting PCC vehicle speed threshold, and the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

In certain forms of the sixth exemplary embodiment the modified gear request is an upshift of the transmission in response to the look ahead route information indicating a decreased road grade, the modified PCC setting comprises the modified PCC vehicle speed target and the modified PCC vehicle speed threshold, the modified PCC vehicle speed threshold is increased relative to a preexisting PCC vehicle speed threshold, the modified PCC vehicle speed target is greater than the modified PCC vehicle speed threshold, and the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

In certain forms of the sixth exemplary embodiment the modified PCC setting comprises the modified PCC vehicle speed, the electronic control system is configured to determine a travel time savings attributable to the modified gear request, and the electronic control system is configured to reduce the travel time savings by dynamically controlling the modified PCC vehicle speed to at least one of: delay initiation of a pre-uphill acceleration of the vehicle system, reduce a rate of pre-uphill acceleration of the vehicle system, advance initiation of a pre-downhill deceleration of the vehicle system, increase a rate of pre-downhill acceleration of the vehicle system, delay initiation of a post-uphill acceleration of the vehicle system, and reduce a rate of post-uphill acceleration of the vehicle system.

In certain forms of the sixth exemplary embodiment the electronic control system is structured to: determine a projected engine power requirement for the engine based on the look ahead route information, the projected engine power requirement including an engine power required to maintain a vehicle speed within predetermined route parameters utilizing the default shift schedule; determine a projected change of the vehicle speed based on the projected engine power requirement; determine a projected change in time required to travel over a window of the look ahead route; generate the modified gear request based on at least one of the projected engine power requirement, the projected change of vehicle speed, and the projected change in time required; and dynamically adjust the modified PCC vehicle speed target in response to the gear request.

In certain forms of the sixth exemplary embodiment the electronic control system is structured to dynamically adjust the modified PCC vehicle speed target to reduce a positive power reserve otherwise resulting from the modified gear request effective to improve fuel economy of the vehicle system.

In certain forms of the sixth exemplary embodiment the electronic control system is structured to dynamically adjust the modified PCC vehicle speed target to reduce a time savings otherwise resulting from the modified gear request effective to improve fuel economy of the vehicle system.

A seventh exemplary embodiment is method of controlling a vehicle system including an engine, a transmission coupled with the engine and an electronic control system coupled with the engine and the transmission, the method comprising operating the electronic control system to perform the acts of: determining a modified gear request in response to look ahead route information for at least part of a route to be traveled by the vehicle system, the modified gear request defining a gear state of the transmission different from a default shift schedule gear state, determining a modified predictive cruise control (PCC) setting in response to the modified gear request, the modified PCC setting comprising one or both of a modified PCC vehicle speed target and a modified PCC vehicle speed threshold defining a limit on PCC operation, and controlling the engine and the transmission in response to the modified predictive cruise control setting and the modified gear request.

In certain forms of the seventh exemplary embodiment the modified PCC setting comprises the modified PCC vehicle speed target and the modified PCC vehicle speed threshold, and the modified PCC vehicle speed target and the modified PCC vehicle speed threshold provide modified operation of the engine with increased efficiency relative to an unmodified operation of the engine in response to a preexisting PCC vehicle speed target and a preexisting PCC vehicle speed threshold.

In certain forms of the seventh exemplary embodiment the modified gear request is a downshift of the transmission in response to the look ahead route information indicating an increased road grade, the modified PCC setting comprises the modified PCC vehicle speed target and the modified PCC vehicle speed threshold, the modified PCC vehicle speed threshold is reduced relative to a preexisting PCC vehicle speed threshold, the modified PCC vehicle speed target is less than the preexisting PCC vehicle speed threshold, and the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

In certain forms of the seventh exemplary embodiment the modified gear request is an upshift of the transmission in response to the look ahead route information indicating a decreased road grade, the modified PCC setting comprises the modified PCC vehicle speed target and the modified PCC vehicle speed threshold, the modified PCC vehicle speed threshold is increased relative to a preexisting PCC vehicle speed threshold, the modified PCC vehicle speed target is greater than the modified PCC vehicle speed threshold, and the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

In certain forms of the seventh exemplary embodiment the acts of operating the electronic control system comprise determining a travel time savings attributable to the modified gear request, and reducing the travel time savings by dynamically controlling the modified PCC vehicle speed to at least one of: delay initiation of a pre-uphill acceleration of the vehicle system, reduce a rate of pre-uphill acceleration of the vehicle system, advance initiation of a pre-downhill deceleration of the vehicle system, increase a rate of pre-downhill acceleration of the vehicle system, delay initiation of a post-uphill acceleration of the vehicle system, and reduce a rate of post-uphill acceleration of the vehicle system.

In certain forms of the seventh exemplary embodiment the acts of operating the electronic control system comprise determining a projected engine power requirement for the engine based on the look ahead route information, the projected engine power requirement including an engine power required to maintain a vehicle speed within predetermined route parameters utilizing the default shift schedule; determining a projected change of the vehicle speed based on the projected engine power requirement; generating the modified gear request based on the projected engine power requirement and the projected change of vehicle speed; and dynamically adjusting the modified PCC vehicle speed target in response to the gear request.

In certain forms of the seventh exemplary embodiment the act of dynamically adjusting the modified PCC vehicle speed target is effective to reduce a positive power reserve otherwise resulting from the modified gear request effective to improve fuel economy of the vehicle system.

In certain forms of the seventh exemplary embodiment the act of dynamically adjust the modified PCC vehicle speed target is effective to reduce a time savings otherwise resulting from the modified gear request effective to improve fuel economy of the vehicle system.

A ninth exemplary embodiment is an apparatus comprising: an electronic control system configured to control operation of an engine and a transmission of a vehicle system by executing instructions stored in a non-transitory controller-readable medium to perform the acts of: determining a modified gear request in response to look ahead route information for at least part of a route to be traveled by the vehicle system, the modified gear request defining a gear state of the transmission different from a default shift schedule gear state, determining a modified predictive cruise control (PCC) setting in response to the modified gear request, the modified PCC setting comprising one or both of a modified PCC vehicle speed target and a modified PCC vehicle speed threshold defining a limit on PCC operation, and controlling the engine and the transmission in response to the modified predictive cruise control setting and the modified gear request.

In certain forms of the ninth exemplary embodiment the modified PCC setting comprises the modified PCC vehicle speed target and the modified PCC vehicle speed threshold, and the modified PCC vehicle speed target and the modified PCC vehicle speed threshold provide modified operation of the engine with increased efficiency relative to an unmodified operation of the engine in response to a preexisting PCC vehicle speed target and a preexisting PCC vehicle speed threshold.

In certain forms of the ninth exemplary embodiment the modified gear request is a downshift of the transmission in response to the look ahead route information indicating an increased road grade, the modified PCC setting comprises the modified PCC vehicle speed target and the modified PCC vehicle speed threshold, the modified PCC vehicle speed threshold is reduced relative to a preexisting PCC vehicle speed threshold, the modified PCC vehicle speed target is less than the preexisting PCC vehicle speed threshold, and the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

In certain forms of the ninth exemplary embodiment the modified gear request is an upshift of the transmission in response to the look ahead route information indicating a decreased road grade, the modified PCC setting comprises the modified PCC vehicle speed target and the modified PCC vehicle speed threshold, the modified PCC vehicle speed threshold is increased relative to a preexisting PCC vehicle speed threshold, the modified PCC vehicle speed target is greater than the modified PCC vehicle speed threshold, and the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

In certain forms of the ninth exemplary embodiment the modified PCC setting comprises the modified PCC vehicle speed, the electronic control system is configured to determine a travel time savings attributable to the modified gear request, and the electronic control system is configured to reduce the travel time savings by dynamically controlling the modified PCC vehicle speed to at least one of: delay initiation of a pre-uphill acceleration of the vehicle system, reduce a rate of pre-uphill acceleration of the vehicle system, advance initiation of a pre-downhill deceleration of the vehicle system, increase a rate of pre-downhill acceleration of the vehicle system, delay initiation of a post-uphill acceleration of the vehicle system, and reduce a rate of post-uphill acceleration of the vehicle system.

In certain forms of the ninth exemplary embodiment the electronic control system is structured to perform the acts of: determining a projected engine power requirement for the engine based on the look ahead route information, the projected engine power requirement including an engine power required to maintain a vehicle speed within predetermined route parameters utilizing the default shift schedule; determining a projected change of the vehicle speed based on the projected engine power requirement; generating the modified gear request based on the projected engine power requirement and the projected change of vehicle speed; and dynamically adjusting the modified PCC vehicle speed target in response to the gear request.

In certain forms of the ninth exemplary embodiment the electronic control system is structured to dynamically adjust the modified PCC vehicle speed target to reduce a positive power reserve otherwise resulting from the modified gear request effective to improve fuel economy of the vehicle system.

In certain forms of the ninth exemplary embodiment the electronic control system is structured to dynamically adjust the modified PCC vehicle speed target to reduce a time savings otherwise resulting from the modified gear request effective to improve fuel economy of the vehicle system.

As will be understood by one skilled in the art having the benefit of the present disclosure, the terms used to identify the components of the systems and methods disclosed herein may be similarly described by other terms unless explicitly provided to the contrary. While various embodiments of an engine and transmission control system and methods for using the same have been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected. A variety of further embodiments according to the present disclosure are contemplated. Those skilled in the art will appreciate that many modifications are possible in the example embodiments without materially departing from this disclosure. Accordingly, all such modifications are intended to be included within the scope of this disclosure as defined in the following claims.

The invention claimed is:

1. A vehicle system comprising:
   an engine configured to output torque;
   a transmission structured to receive torque from the engine and to output torque to propel the vehicle system;
   an electronic control system operatively coupled with the engine and the transmission, the electronic control system being structured to:
   determine a modified gear request in response to look ahead route information for at least part of a route to be traveled by the vehicle system, the modified gear request defining a gear state of the transmission different from a default shift schedule gear state,
   determine a modified predictive cruise control (PCC) setting in response to the modified gear request, the modified PCC setting comprising one or both of a modified PCC vehicle speed target and a modified PCC vehicle speed threshold defining a limit on PCC operation, and control the engine and the transmission in response to the modified predictive cruise control setting and the modified gear request.

2. The vehicle system of claim 1 wherein the modified PCC setting comprises the modified PCC vehicle speed target and the modified PCC vehicle speed threshold, and the modified PCC vehicle speed target and the modified PCC vehicle speed threshold provide modified operation of the engine with increased efficiency relative to an unmodified operation of the engine in response to a preexisting PCC vehicle speed target and a preexisting PCC vehicle speed threshold.

3. The vehicle system of claim 1 wherein
the modified gear request is a downshift of the transmission in response to the look ahead route information indicating an increased road grade,
the modified PCC setting comprises the modified PCC vehicle speed target and the modified PCC vehicle speed threshold,
the modified PCC vehicle speed threshold is reduced relative to a preexisting PCC vehicle speed threshold,
the modified PCC vehicle speed target is less than the preexisting PCC vehicle speed threshold, and
the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

4. The vehicle system of claim 1 wherein
the modified gear request is an upshift of the transmission in response to the look ahead route information indicating a decreased road grade,
the modified PCC setting comprises the modified PCC vehicle speed target and the modified PCC vehicle speed threshold,
the modified PCC vehicle speed threshold is increased relative to a preexisting PCC vehicle speed threshold,
the modified PCC vehicle speed target is greater than the modified PCC vehicle speed threshold, and
the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

5. The vehicle system of claim 1 wherein
the modified PCC setting comprises the modified PCC vehicle speed,
the electronic control system is configured to determine a travel time savings attributable to the modified gear request, and
the electronic control system is configured to reduce the travel time savings by dynamically controlling the modified PCC vehicle speed to at least one of:
delay initiation of a pre-uphill acceleration of the vehicle system,
reduce a rate of pre-uphill acceleration of the vehicle system,
advance initiation of a pre-downhill deceleration of the vehicle system,
increase a rate of pre-downhill acceleration of the vehicle system,
delay initiation of a post-uphill acceleration of the vehicle system, and
reduce a rate of post-uphill acceleration of the vehicle system.

6. The vehicle system according to claim 1 wherein the electronic control system is structured to:
determine a projected engine power requirement for the engine based on the look ahead route information, the projected engine power requirement including an engine power required to maintain a vehicle speed within predetermined route parameters utilizing the default shift schedule;
determine a projected change of the vehicle speed based on the projected engine power requirement;
determine a projected change in time required to travel over a window of the look ahead route;
generate the modified gear request based on at least one of the projected engine power requirement, the projected change of vehicle speed, and the projected change in time required; and
dynamically adjust the modified PCC vehicle speed target in response to the gear request.

7. The vehicle system according to claim 6 wherein the electronic control system is structured to dynamically adjust the modified PCC vehicle speed target to reduce a positive power reserve otherwise resulting from the modified gear request effective to improve fuel economy of the vehicle system.

8. The vehicle system according to claim 6 wherein the electronic control system is structured to dynamically adjust the modified PCC vehicle speed target to reduce a time savings otherwise resulting from the modified gear request effective to improve fuel economy of the vehicle system.

9. A method of controlling a vehicle system including an engine, a transmission coupled with the engine and an electronic control system coupled with the engine and the transmission, the method comprising operating the electronic control system to perform the acts of
determining a modified gear request in response to look ahead route information for at least part of a route to be traveled by the vehicle system, the modified gear request defining a gear state of the transmission different from a default shift schedule gear state,
determining a modified predictive cruise control (PCC) setting in response to the modified gear request, the modified PCC setting comprising one or both of a modified PCC vehicle speed target and a modified PCC vehicle speed threshold defining a limit on PCC operation, and
controlling the engine and the transmission in response to the modified predictive cruise control setting and the modified gear request.

10. The method of claim 9 wherein the modified PCC setting comprises the modified PCC vehicle speed target and the modified PCC vehicle speed threshold, and the modified PCC vehicle speed target and the modified PCC vehicle speed threshold provide modified operation of the engine with increased efficiency relative to an unmodified operation of the engine in response to a preexisting PCC vehicle speed target and a preexisting PCC vehicle speed threshold.

11. The method of claim 9 wherein
the modified gear request is a downshift of the transmission in response to the look ahead route information indicating an increased road grade,
the modified PCC setting comprises the modified PCC vehicle speed target and the modified PCC vehicle speed threshold, the modified PCC vehicle speed threshold is reduced relative to a preexisting PCC vehicle speed threshold, the modified PCC vehicle speed target is less than the preexisting PCC vehicle speed threshold, and the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

12. The method of claim 9 wherein the modified gear request is an upshift of the transmission in response to the look ahead route information indicating a decreased road grade, the modified PCC setting comprises the modified PCC vehicle speed target and the modified PCC vehicle speed threshold, the modified PCC vehicle speed threshold is increased relative to a preexisting PCC vehicle speed threshold, the modified PCC vehicle speed target is greater than the modified PCC vehicle speed threshold, and the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

13. The method of claim 9 wherein the acts of operating the electronic control system comprise determining a travel time savings attributable to the modified gear request, and reducing the travel time savings by dynamically controlling the modified PCC vehicle speed to at least one of:

delay initiation of a pre-uphill acceleration of the vehicle system, reduce a rate of pre-uphill acceleration of the vehicle system, advance initiation of a pre-downhill deceleration of the vehicle system, increase a rate of pre-downhill acceleration of the vehicle system, delay initiation of a post-uphill acceleration of the vehicle system, and reduce a rate of post-uphill acceleration of the vehicle system.

14. The method of claim 9 wherein the acts of operating the electronic control system comprise determining a projected engine power requirement for the engine based on the look ahead route information, the projected engine power requirement including an engine power required to maintain a vehicle speed within predetermined route parameters utilizing the default shift schedule;

determining a projected change of the vehicle speed based on the projected engine power requirement;

generating the modified gear request based on the projected engine power requirement and the projected change of vehicle speed; and dynamically adjusting the modified PCC vehicle speed target in response to the gear request.

15. The method according to claim 14 wherein the act of dynamically adjusting the modified PCC vehicle speed target is effective to reduce a positive power reserve otherwise resulting from the modified gear request effective to improve fuel economy of the vehicle system.

16. The method according to claim 14 wherein the act of dynamically adjust the modified PCC vehicle speed target is effective to reduce a time savings otherwise resulting from the modified gear request effective to improve fuel economy of the vehicle system.

17. An apparatus comprising:

an electronic control system configured to control operation of an engine and a transmission of a vehicle system by executing instructions stored in a non-transitory controller-readable medium to perform the acts of:

determining a modified gear request in response to look ahead route information for at least part of a route to be traveled by the vehicle system, the modified gear request defining a gear state of the transmission different from a default shift schedule gear state, determining a modified predictive cruise control (PCC) setting in response to the modified gear request, the modified PCC setting comprising one or both of a modified PCC vehicle speed target and a modified PCC vehicle speed threshold defining a limit on PCC operation, and controlling the engine and the transmission in response to the modified predictive cruise control setting and the modified gear request.

18. The apparatus according to claim 17 wherein the modified PCC setting comprises the modified PCC vehicle speed target and the modified PCC vehicle speed threshold, and the modified PCC vehicle speed target and the modified PCC vehicle speed threshold provide modified operation of the engine with increased efficiency relative to an unmodified operation of the engine in response to a preexisting PCC vehicle speed target and a preexisting PCC vehicle speed threshold.

19. The apparatus according to claim 17 wherein the modified gear request is a downshift of the transmission in response to the look ahead route information indicating an increased road grade, the modified PCC setting comprises the modified PCC vehicle speed target and the modified PCC vehicle speed threshold, the modified PCC vehicle speed threshold is reduced relative to a preexisting PCC vehicle speed threshold, the modified PCC vehicle speed target is less than the preexisting PCC vehicle speed threshold, and the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

20. The apparatus according to claim 17 wherein the modified gear request is an upshift of the transmission in response to the look ahead route information indicating a decreased road grade, the modified PCC setting comprises the modified PCC vehicle speed target and the modified PCC vehicle speed threshold, the modified PCC vehicle speed threshold is increased relative to a preexisting PCC vehicle speed threshold, the modified PCC vehicle speed target is greater than the modified PCC vehicle speed threshold, and the modified PCC vehicle speed target and the modified PCC vehicle speed threshold provide modified operation of the engine with increased efficiency relative to unmodified operation of the engine in response to the preexisting PCC vehicle speed target and the preexisting PCC vehicle speed threshold.

21. The apparatus according to claim 17 wherein
the modified PCC setting comprises the modified PCC vehicle speed,
the electronic control system is configured to determine a travel time savings attributable to the modified gear request, and
the electronic control system is configured to reduce the travel time savings by dynamically controlling the modified PCC vehicle speed to at least one of:
delay initiation of a pre-uphill acceleration of the vehicle system,
reduce a rate of pre-uphill acceleration of the vehicle system,
advance initiation of a pre-downhill deceleration of the vehicle system,
increase a rate of pre-downhill acceleration of the vehicle system,
delay initiation of a post-uphill acceleration of the vehicle system, and
reduce a rate of post-uphill acceleration of the vehicle system.

22. The apparatus of claim 17 wherein the electronic control system is structured to perform the acts of:
determining a projected engine power requirement for the engine based on the look ahead route information, the projected engine power requirement including an engine power required to maintain a vehicle speed within predetermined route parameters utilizing the default shift schedule;
determining a projected change of the vehicle speed based on the projected engine power requirement;
generating the modified gear request based on the projected engine power requirement and the projected change of vehicle speed; and
dynamically adjusting the modified PCC vehicle speed target in response to the gear request.

23. The apparatus according to claim 22 wherein the electronic control system is structured to dynamically adjust the modified PCC vehicle speed target to reduce a positive power reserve otherwise resulting from the modified gear request effective to improve fuel economy of the vehicle system.

24. The apparatus according to claim 22 wherein the electronic control system is structured to dynamically adjust the modified PCC vehicle speed target to reduce a time savings otherwise resulting from the modified gear request effective to improve fuel economy of the vehicle system.

* * * * *